US012646453B2

(12) United States Patent
Lee

(10) Patent No.: US 12,646,453 B2
(45) Date of Patent: Jun. 2, 2026

(54) SUB-PIXEL, DISPLAY DEVICE INCLUDING THE SUB-PIXEL, AND ELECTRONIC DEVICE INCLUDING THE DISPLAY DEVICE

(71) Applicant: Samsung Display Co., LTD., Yongin-si (KR)

(72) Inventor: Se Hyun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/208,891

(22) Filed: May 15, 2025

(65) Prior Publication Data

US 2025/0391340 A1 Dec. 25, 2025

(30) Foreign Application Priority Data

Jun. 20, 2024 (KR) ........................ 10-2024-0080182
Sep. 3, 2024 (KR) ........................ 10-2024-0119528

(51) Int. Cl.
*G09G 3/32* (2016.01)
*G09G 3/3233* (2016.01)
(Continued)

(52) U.S. Cl.
CPC ............. *G09G 3/32* (2013.01); *G09G 3/3233* (2013.01); *G09G 3/3266* (2013.01);
(Continued)

(58) Field of Classification Search
CPC ............. G09G 2300/0852; G09G 3/32; G09G 3/3233; G09G 3/3266; G09G 3/3275;
(Continued)

(56) References Cited

U.S. PATENT DOCUMENTS 9,626,904 B2 4/2017 Kimura et al.
2015/0138253 A1 * 5/2015 Kimura ................ G09G 3/3266 345/77
(Continued)

FOREIGN PATENT DOCUMENTS

KR 102297000 B1 9/2021

*Primary Examiner* — Temesghen Ghebretinsae
*Assistant Examiner* — Ivelisse Martinez Quiles
(74) *Attorney, Agent, or Firm* — CANTOR COLBURN LLP

(57) ABSTRACT

A sub-pixel includes a first transistor including a first electrode connected to a third node, a second electrode connected to a first node, and a gate electrode connected to a second node, a second transistor including a first electrode connected to the second node, a second electrode electrically connected to one of a plurality of data lines, and a gate electrode electrically connected to a first sub-gate line, a fourth transistor including a first electrode electrically connected to a third power line, a second electrode connected to the third node, and a gate electrode electrically connected to a second sub-gate line, a third capacitor including an electrode connected to the gate electrode of the fourth transistor and another electrode connected to the second node, and a fourth capacitor including an electrode connected to the gate electrode of the second transistor and another electrode connected to the second node.

18 Claims, 21 Drawing Sheets

(51) Int. Cl.
*G09G 3/3266* (2016.01)
*G09G 3/3275* (2016.01)

(52) U.S. Cl.
CPC ... *G09G 3/3275* (2013.01); *G09G 2300/0819* (2013.01); *G09G 2310/0267* (2013.01); *G09G 2310/0275* (2013.01); *G09G 2330/021* (2013.01); *G09G 2330/028* (2013.01); *G09G 2340/0457* (2013.01)

(58) Field of Classification Search
CPC ... G09G 2300/0819; G09G 2310/0267; G09G 2310/0275; G09G 2330/021; G09G 2330/028; G09G 2340/0457; G09G 2300/0842
See application file for complete search history.

(56) References Cited

U.S. PATENT DOCUMENTS

2023/0232660 A1* 7/2023 Kim ..................... H10K 59/131 257/40
2025/0061862 A1* 2/2025 Lee .................... H10K 59/1213

* cited by examiner

<PR1>

GLi: SGL1i, SGL2i

<PR3>

GLi: SGL1i, SGL2i

<PR4>

GLi: SGL1i, SGL2i

SUB-PIXEL, DISPLAY DEVICE INCLUDING THE SUB-PIXEL, AND ELECTRONIC DEVICE INCLUDING THE DISPLAY DEVICE

This application claims priority to Korean Patent Application No. 10-2024-0080182, filed on Jun. 20, 2024, and Korean Patent Application No. 10-2024-0119528, filed on Sep. 3, 2024, and all the benefits accruing therefrom under 35 U.S.C. § 119, the contents of which in their entirety are herein incorporated by reference.

BACKGROUND

1. Field

The disclosure relates to a sub-pixel, a display device including the sub-pixel, and electronic device including the display device.

2. Description of the Related Art

As information technology develops, the importance of a display device, which is a connection medium between a user and information, is emerging. In response to this, the use of a display device such as, for example, a liquid crystal display device and an organic light emitting display device is increasing.

Some head mounted display devices (HMDs) have been developed. An HMD is a display device that implements virtual reality (VR) or augmented reality (AR) in which a user wears the HMD in a form of glasses or a helmet and a focus is formed at a distance close to the eyes of the user. A high-resolution panel is applied to the HMD, and thus a pixel that may be applied to the high-resolution panel is desired.

The content described herein is intended to help understanding of the background technology of the technical ideas of the disclosure, and thus the content cannot be deemed as content corresponding to prior art known to those skilled in the art in the FIELD of the disclosure.

SUMMARY

An object of the disclosure is to provide a sub-pixel applicable to a high-resolution panel, a display device including the sub-pixel, and a method of driving the sub-pixel.

According to embodiments of the disclosure, a sub-pixel includes a first transistor including a first electrode connected to a third node, a second electrode connected to a first node, and a gate electrode connected to a second node, a second transistor including a first electrode connected to the second node, a second electrode electrically connected to one of a plurality of data lines, and a gate electrode electrically connected to a first sub-gate line, a fourth transistor including a first electrode electrically connected to a third power line, a second electrode connected to the third node, and a gate electrode electrically connected to a second sub-gate line, a third capacitor including an electrode connected to the gate electrode of the fourth transistor and another electrode connected to the second node, and a fourth capacitor including an electrode connected to the gate electrode of the second transistor and another electrode connected to the second node.

The sub-pixel may further include a third transistor including a first electrode connected to the first node, a second electrode electrically connected to a first power line to which a first driving voltage is applied, and a gate electrode electrically connected to an emission control line, and a light emitting element including an electrode connected to the third node and another electrode connected to a second power line to which a second driving voltage is applied.

The sub-pixel may further include a first capacitor including an electrode connected to the second node and another electrode connected to the first node, and a second capacitor including an electrode connected to the second node and another electrode connected to the third node.

Each of the first transistor to the fourth transistor may be turned on during a first period.

A data voltage may be applied to the second node and an initialization voltage may be applied to the third node during the first period.

Each of the first transistor, the second transistor, and the fourth transistor may be turned on during a second period after the first period, and the third transistor may be turned off during the second period.

Each of the first transistor, the third transistor, and the fourth transistor may be turned on during a third period after the second period, and the second transistor may be turned off during the third period.

Each of the first transistor and the third transistor may be turned on during a fourth period after the third period, and each of the second transistor and the fourth transistor may be turned off during the fourth period.

Each of the first transistor to the third transistor may be a P-type transistor, and the fourth transistor may be an N-type transistor.

A capacitance of the third capacitor and a capacitance of the fourth capacitor may be substantially equal.

According to embodiments of the disclosure, a display device includes a display panel including: a plurality of sub-pixels are disposed, a plurality of data lines, a plurality of sub-gate lines, and an emission control line connected to the plurality of sub-pixels, a data driver configured to provide data signals to the plurality of data lines, a gate driver configured to provide gate signals to the plurality of sub-gate lines and an emission control signal to the emission control line, and a voltage generator configured to apply an initialization voltage, a first driving voltage, and a second driving voltage to the plurality of sub-pixels, the plurality of sub-gate lines include a first sub-gate line and a second sub-gate line, and each of the plurality of sub-pixels includes a first transistor including a first electrode connected to a third node, a second electrode connected to a first node, and a gate electrode connected to a second node, a second transistor including a first electrode connected to the second node, a second electrode electrically connected to one of the plurality of data lines, and a gate electrode electrically connected to the first sub-gate line, a fourth transistor including a first electrode electrically connected to a third power line, a second electrode connected to the third node, and a gate electrode electrically connected to the second sub-gate line, a third capacitor including an electrode connected to the gate electrode of the fourth transistor and another electrode connected to the second node, and a fourth capacitor including an electrode connected to the gate electrode of the second transistor and another electrode connected to the second node.

Each of the plurality of sub-pixels may further include a third transistor including a first electrode connected to the first node, a second electrode electrically connected to a first power line to which the first driving voltage is applied, and a gate electrode electrically connected to the emission control line, a first capacitor including an electrode connected to the second node and another electrode connected to the first node, a second capacitor including an electrode connected to the second node and another electrode connected to the third node, and a light emitting element including an electrode connected to the third node and another electrode connected to a second power line to which the second driving voltage is applied.

The data driver may provide a data signal to the second node during a first period, the gate driver may provide a gate signal of a turn-on level to each of the second transistor and the fourth transistor during the first period, and the gate driver may provide the emission control signal of a turn-on level to the third transistor during the first period.

The data driver may provide the data signal to the second node during a second period after the first period, the gate driver may provide the gate signal of the turn-on level to each of the second transistor and the fourth transistor during the second period, and the gate driver may provide the emission control signal of a turn-off level to the third transistor during the second period.

The gate driver may provide the gate signal of a turn-off level to the second transistor during a third period after the second period, the gate driver may provide the emission control signal of a turn-on level to the third transistor during the third period, and the gate driver may provide the gate signal of a turn-on level to the fourth transistor during the third period.

The gate driver may provide the gate signal of a turn-off level to the second transistor and the fourth transistor during a fourth period after the third period, and the gate driver may provide the emission control signal of a turn-on level to the third transistor during the fourth period.

A method of driving a sub-pixel including a first transistor including a first electrode connected to a third node, a second electrode connected to a first node, and a gate electrode connected to a second node, and a first capacitor connected between the first node and the second node includes supplying a data voltage to the second node of the first transistor and supplying an initialization voltage to the third node of the first transistor during a first period, storing a threshold voltage of the first transistor in the first capacitor during a second period, supplying a first driving voltage to the first node during a third period, and applying a voltage to the second node during a fourth period, wherein applying the voltage causes a current to flow to the first transistor.

The method may further include supplying the initialization voltage to a light emitting element comprised in the sub-pixel during the first period.

The sub-pixel may further include a third capacitor and a fourth capacitor connected to the second node, the third capacitor may decrease the voltage supplied to the second node during the fourth period, and the fourth capacitor may increase the voltage supplied to the second node during the fourth period.

A decrease amount of the voltage supplied to the second node by the third capacitor and an increase amount of the voltage supplied to the second node by the fourth capacitor may be substantially equal.

According to embodiments of the disclosure, a sub-pixel applicable to a high-resolution panel, a display device including the sub-pixel, and a method of driving the sub-pixel may be provided.

An effect according to embodiments is not limited by the example contents above, and more various effects are included in the present specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
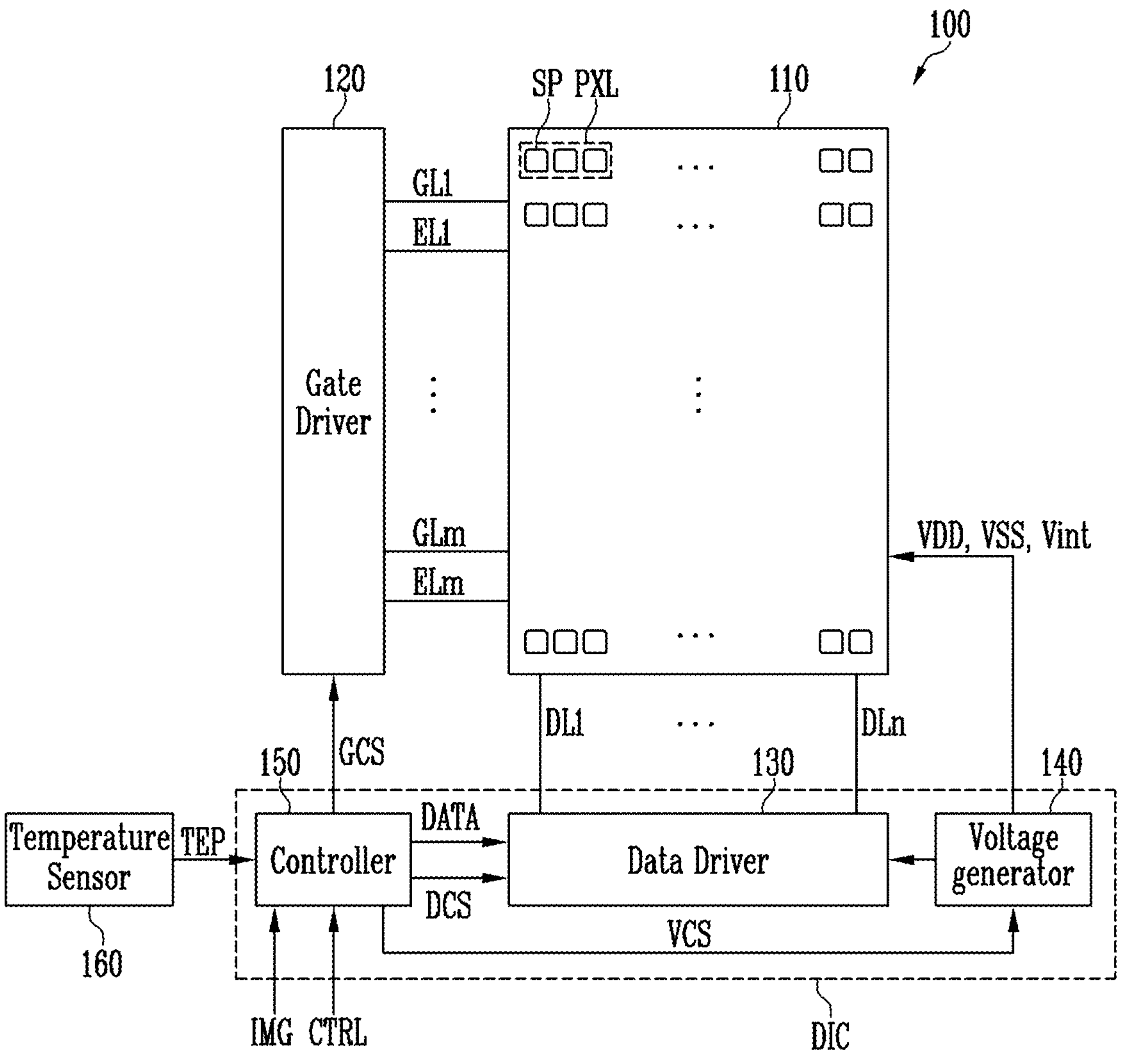
FIG. 1 is a block diagram illustrating an embodiment of a display device.

Hereinafter, a preferred embodiment according to the disclosure is described in detail with reference to the accompanying drawings. It should be noted that in the following description, portions supportive of understanding an operation according to the disclosure are described, and descriptions of other portions are omitted in order not to obscure the subject matter of the disclosure. In some aspects, the disclosure may be embodied in other forms without being limited to the embodiment described herein. However, the embodiment described herein is provided to describe in detail enough to easily implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any of X, Y, and Z" and "at least any selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as, for example, first and second may be used to describe various components, but these components are not limited to these terms. These terms are used to distinguish one component from another component. Therefore, a first component may refer to a second component within a range without departing from the scope disclosed herein.

Spatially relative terms such as, for example, "under", "on", and the like may be used for descriptive purposes, thereby describing a relationship between one element or feature and another element(s) or feature(s) as illustrated in the drawings. Spatially relative terms are intended to include other directions in use, in operation, and/or in manufacturing, in addition to the direction depicted in the drawings. In an example in which a device illustrated in the drawing is turned upside down, elements depicted as being positioned "under" other elements or features are positioned in a direction "on" the other elements or features. Therefore, in an embodiment, the term "under" may include both directions of on and under. In some aspects, the device may face in other directions (for example, rotated 90 degrees or in other directions) and thus the spatially relative terms used herein are interpreted according thereto.

The term "substantially," as used herein, means approximately or actually. The term "substantially equal" means approximately or actually equal. The term "substantially the same" means approximately or actually the same. The term "substantially perpendicular" means approximately or actually perpendicular. The term "substantially parallel" means approximately or actually parallel.

The term "adjacent" herein may refer to elements which are relatively close to each other (e.g., within a threshold distance), or alternatively, elements which are in contact with each other. For example, for a subpixel described as adjacent to another subpixel, a further subpixel is not present between the adjacent subpixels.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to illustrated specific shapes, and should be interpreted as including, for example, changes in shapes that occur as a result of manufacturing. As described herein, the shapes illustrated in the drawings may not show actual shapes of areas of a device, and the present embodiments are not limited thereto.

FIG. 1 is a block diagram illustrating an embodiment of a display device.

Referring to FIG. 1, the display device 100 may include a display panel 110, a gate driver 120, a data driver 130, a voltage generator 140, and a controller 150.

The display panel 110 includes sub-pixels SP. The sub-pixels SP may be connected to the gate driver 120 through first to m-th gate lines GL1 to GLm. The sub-pixels SP may be connected to the data driver 130 through first to n-th data lines DL1 to DLn.

Each of the sub-pixels SP may include at least one light emitting element configured to generate light. Accordingly, each of the sub-pixels SP may generate light of a specific color such as, for example, red, green, blue, cyan, magenta, or yellow. Two or more sub-pixels among the sub-pixels SP may configure one pixel PXL. For example, as illustrated in FIG. 1, three sub-pixels may configure one pixel PXL.

The gate driver 120 is connected to the sub-pixels SP arranged in a row direction through the first to m-th gate lines GL1 to GLm. The gate driver 120 may output gate signals to the first to m-th gate lines GL1 to GLm in response to a gate control signal GCS. In embodiments, the gate control signal GCS may include a start signal indicating a start of each frame, a horizontal synchronization signal for outputting the gate signals in synchronization with a timing at which data signals are applied, and the like.

In embodiments, first to m-th emission control lines EL1 to ELm connected to the sub-pixels SP of the row direction may be further provided. In this case, the gate driver 120 may include an emission control driver configured to control the first to m-th emission control lines EL1 to ELm, and the emission control driver may operate under control of the controller 150.

The gate driver 120 may be disposed on one side of the display panel 110. However, embodiments are not limited thereto. For example, the gate driver 120 may be divided into two or more physically and/or logically divided drivers, and such drivers may be disposed on one side of the display panel 110 and another side of the display panel 110 opposite the one side. As described herein, the gate driver 120 may be disposed around the display panel 110 in various shapes according to embodiments.

The data driver 130 is connected to the sub-pixels SP arranged in a column direction through the first to n-th data lines DL1 to DLn. The data driver 130 receives image data DATA and a data control signal DCS from the controller 150. The data driver 130 operates in response to the data control signal DCS. In embodiments, the data control signal DCS may include a source start pulse, a source shift clock, a source output enable signal, and the like.

The data driver 130 may apply data signals having grayscale voltages corresponding to the image data DATA to the first to n-th data lines DL1 to DLn using voltages from the voltage generator 140. In an example in which the gate signal is applied to each of the first to m-th gate lines GL1 to GLm, the data signals corresponding to the image data DATA may be applied to the data lines DL1 to DLm. Accordingly, the corresponding sub-pixels SP may generate light corresponding to the data signals. Accordingly, an image is displayed on the display panel 110.

In embodiments, the gate driver 120 and the data driver 130 may include complementary metal-oxide semiconductor (CMOS) circuit elements.

The voltage generator 140 may operate in response to a voltage control signal VCS from the controller 150. The voltage generator 140 is configured to generate a plurality of voltages and provide the generated voltages to components of the display device 100. For example, the voltage generator 140 may be configured to generate the plurality of voltages by receiving an input voltage from an outside of the display device 100, adjusting the received voltage, and regulating the adjusted voltage.

The voltage generator 140 may generate a first driving voltage VDD and a second driving voltage VSS, and the generated first and second driving voltages VDD and VSS may be provided to the sub-pixels SP. The first driving voltage VDD may have a relatively high voltage level, and the second driving voltage VSS may have a voltage level lower than the voltage level of the first driving voltage VDD. In other embodiments, the first driving voltage VDD or the second driving voltage VSS may be provided by an external device of the display device 100.

In some aspects, the voltage generator 140 may generate various voltages. For example, the voltage generator 140 may generate an initialization voltage Vint applied to the sub-pixels SP.

The controller 150 controls overall operations of the display device 100. The controller 150 receives input image data IMG and a control signal CTRL for controlling display of the input image data IMG from the outside. The controller 150 may provide the gate control signal GCS, the data control signal DCS, and the voltage control signal VCS in response to the control signal CTRL.

The controller 150 may convert the input image data IMG such that the input image data IMG is suitable for the display device 100 or the display panel 110 and output the image data DATA. In embodiments, the controller 150 may output the image data DATA by aligning the input image data IMG such that the input image data IMG is suitable for the sub-pixels SP of a row unit.

Two or more components of the data driver 130, the voltage generator 140, and the controller 150 may be mounted on one integrated circuit. As illustrated in FIG. 1, the data driver 130, the voltage generator 140, and the controller 150 may be included in a driver integrated circuit DIC. In this case, the data driver 130, the voltage generator 140, and the controller 150 may be functionally divided components in one driver integrated circuit DIC. In other embodiments, at least one of the data driver 130, the voltage generator 140, and the controller 150 may be provided as a component distinguished from the driver integrated circuit DIC.

The display device 100 may include at least one temperature sensor 160. The temperature sensor 160 is configured to sense a temperature around the temperature sensor 160 and generate temperature data TEP indicating the sensed temperature. In embodiments, the temperature sensor 160 may be disposed adjacent to the display panel 110 and/or the driver integrated circuit DIC. The controller 150 may control various operations of the display device 100 in response to the temperature data TEP. In embodiments, the controller 150 may adjust a luminance of the image output from the display panel 110 in response to the temperature data TEP. For example, the controller 150 may control the data signals and the first and second driving voltages VDD and VSS by controlling components such as, for example, the data driver 130 and/or the voltage generator 140.

Figure 2:
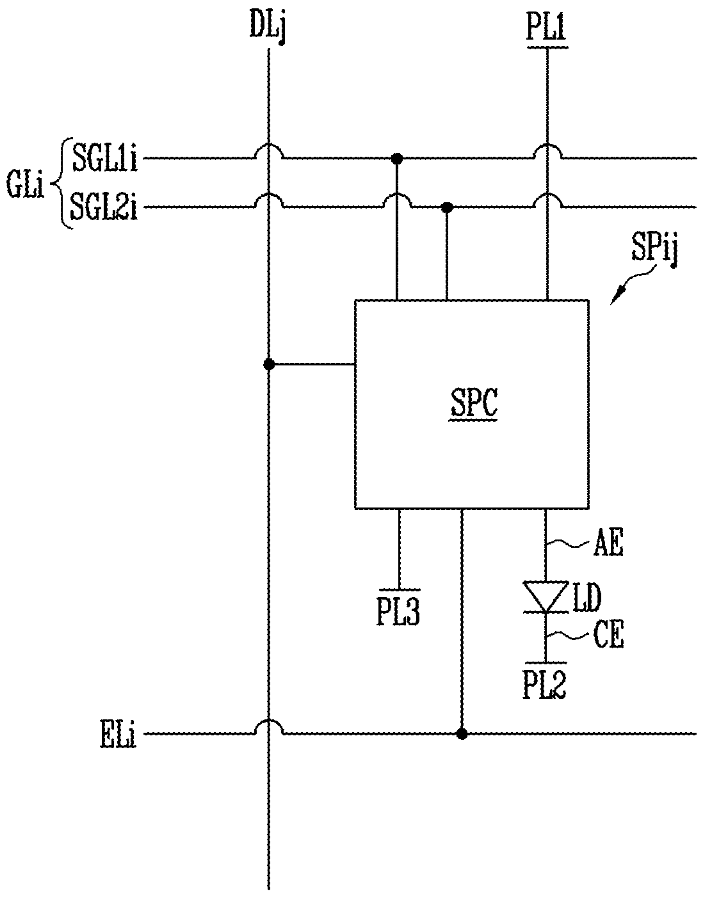
FIG. 2 is a block diagram illustrating an embodiment of one of sub-pixels of FIG. 1.

FIG. 2 is a block diagram illustrating an embodiment of one of the sub-pixels of FIG. 1. In FIG. 2, among the sub-pixels SP of FIG. 1, a sub-pixel SPij arranged in an i-th row (i is an integer greater than or equal to 1 and less than or equal to m) and a j-th column (j is an integer greater than or equal to 1 and less than or equal to n) is illustrated as an example.

Referring to FIG. 2, the sub-pixel SPij may include a sub-pixel circuit SPC and a light emitting element LD.

The sub-pixel SPij may be connected to first to third power lines PL1 to PL3. At this time, the first power line PL1 is a power line that transmits the first driving voltage VDD of FIG. 1 to the sub-pixel SPij, the second power line PL2 is a power line that transmits the second driving voltage VSS of FIG. 1 to the sub-pixel SPij, and the third power line PL3 is a power line that transmits the initialization voltage Vint of FIG. 1 to the sub-pixel SPij.

The light emitting element LD is connected between the first power line PL1 and the second power line PL2. Anode electrodes AE of the light emitting element LD may be connected to the first power line PL1 through the sub-pixel circuit SPC, and a cathode electrode CE of the light emitting element LD may be connected to the second power line PL2. For example, the anode electrodes AE of the light emitting element LD may be connected to the first power line PL1 through one or more transistors included in the sub-pixel circuit SPC.

The sub-pixel circuit SPC may be connected to an i-th gate line GLi among the first to m-th gate lines GL1 to GLm of FIG. 1, an i-th emission control line ELi among the emission control lines EL1 to ELm of FIG. 1, and a j-th data line DLj among the first to n-th data lines DL1 to DLn of FIG. 1. The sub-pixel circuit SPC is configured to control the light emitting element LD according to signals received through these signal lines.

The sub-pixel circuit SPC may operate in response to a gate signal received through the i-th gate line GLi. The i-th gate line GLi may include one or more sub-gate lines. In an example in which the i-th gate line GLi includes two or more sub-gate lines, the sub-pixel circuit SPC may operate in response to gate signals received through corresponding sub-gate lines.

The sub-pixel circuit SPC may receive a data signal through the j-th data line DLj. The sub-pixel circuit SPC may store a voltage corresponding to the data signal in response to at least one of gate signals received through the sub-gate lines of the i-th gate line GLi. The sub-pixel circuit SPC may control a current flowing from the first power line PL1 to the second power line PL2 through the light emitting element LD according to the stored voltage, in response to an emission control signal received through the i-th emission control line ELi. Accordingly, the light emitting element LD may generate light of a luminance corresponding to the data signal.

Figure 3:
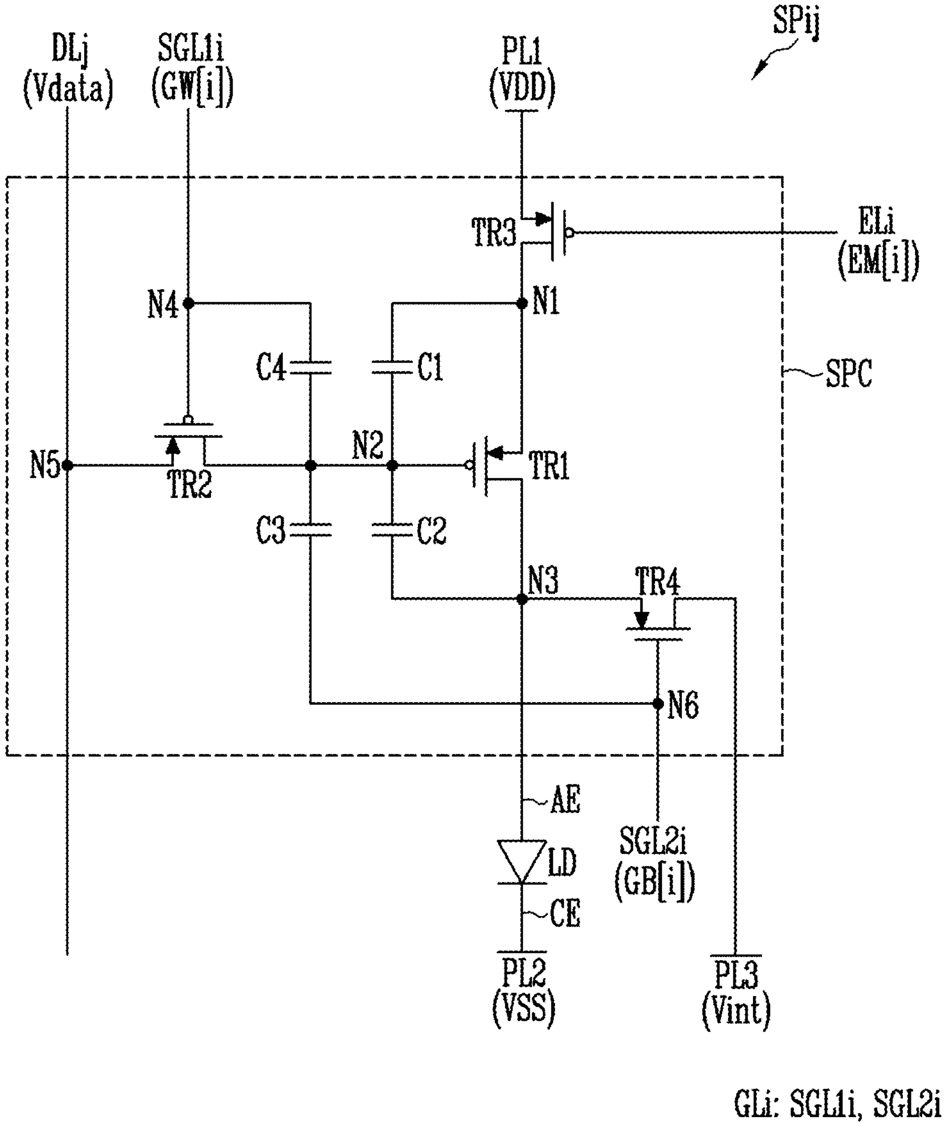
FIG. 3 is a circuit diagram illustrating an embodiment of the sub-pixel illustrated in FIG. 2.

FIG. 3 is a circuit diagram illustrating an embodiment of the sub-pixel of FIG. 2. In FIG. 3, among the sub-pixels SP of FIG. 1, a sub-pixel SPij arranged in an i-th row (i is an integer greater than or equal to 1 and less than or equal to m) and a j-th column (j is an integer greater than or equal to 1 and less than or equal to n) is illustrated as an example.

Referring to FIGS. 2 and 3, the sub-pixel SPij may include the sub-pixel circuit SPC and the light emitting element LD. The sub-pixel circuit SPC may control a current amount supplied to the light emitting element LD.

The sub-pixel circuit SPC may include one or more transistors and one or more capacitors.

Referring to FIG. 3, the sub-pixel circuit SPC according to embodiments of the disclosure may include first to fourth transistors TR1 to TR4 and first to fourth capacitors C1 to C4. In an embodiment, each of the first transistor TR1 to the third transistor TR3 may be a P-type metal oxide semiconductor field effect transistor (MOSFET), and the fourth transistor TR4 may be an N-type MOSFET. In another embodiment, each of the first transistor TR1 to the fourth transistor TR4 may be a P-type MOSFET.

Hereinafter, it is assumed that each of the first transistor TR1 to the third transistor TR3 is a P-type MOSFET, and the fourth transistor TR4 is an N-type MOSFET.

A first electrode of the first transistor TR1 may be connected (for example, electrically connected) to the third node N3, a second electrode may be connected (for example, electrically connected) to a first node N1, and a gate electrode may be connected (for example, electrically connected) to a second node N2.

A first electrode of the second transistor TR2 may be connected (for example, electrically connected) to the second node N2, a second electrode may be electrically connected to the j-th data line DLj (or a fifth node N5) to which a data voltage (or a data signal) Vdata is supplied, and a gate electrode may be electrically connected to a first sub-gate line SGL1*i* (or a fourth node N4). The second transistor TR2 may be turned on or off by a first gate signal GW[i] supplied to the first sub-gate line SGL1*i*. For example, the second transistor TR2 may turn on in response to the first gate signal GW[i] of a turn-on level supplied to the first sub-gate line SGL1*i*.

A first electrode of the third transistor TR3 may be connected (for example, electrically connected) to the first node N1, a second electrode may be electrically connected to the first power line PL1 to which the first driving voltage VDD is supplied, and a gate electrode may be electrically connected to the emission control line ELi to which an emission control signal EM[i] is supplied. The third transistor TR3 may be turned on or off by the emission control signal EM[i] supplied to the emission control line ELi. For example, the third transistor TR3 may turn on in response to the emission control signal EM[i] of a turn-on level supplied to the emission control line ELi.

A first electrode of the fourth transistor TR4 may be connected (for example, electrically connected) to the third power line PL3 to which the initialization voltage Vint is applied, a second electrode may be connected (for example, electrically connected) to the third node N3, and a gate electrode may be electrically connected to a second sub-gate line SGL2*i* (or a sixth node N6). The fourth transistor TR4 may be turned on or off by a second gate signal GB[i] supplied to the second sub-gate line SGL2*i*. For example, the fourth transistor TR4 may turn on in response to the second gate signal GB[i] of a turn-on level supplied to the second sub-gate line SGL2*i*.

A first electrode of the first capacitor C1 may be connected (for example, electrically connected) to the first node N1, and a second electrode may be connected (for example, electrically connected) to the second node N2.

A first electrode of the second capacitor C2 may be connected (for example, electrically connected) to the second node N2, and a second electrode may be connected (for example, electrically connected) to the third node N3.

A first electrode of the third capacitor C3 may be connected (for example, electrically connected) to the second node N2, and a second electrode may be connected (for example, electrically connected) to the sixth node N6.

A first electrode of the fourth capacitor C4 may be connected (for example, electrically connected) to the second node N2, and a second electrode may be connected (for example, electrically connected) to the fourth node N4.

In embodiments, capacitances of the third capacitor C3 and the fourth capacitor C4 may be substantially equal. However, embodiments are not necessarily limited thereto.

A first electrode of the light emitting element LD may be connected (for example, electrically connected) to the third node N3, and a second electrode may be connected (for example, electrically connected) to the second power line PL2 to which the second driving voltage VSS is applied.

The light emitting element LD may generate light (for example, light of a predetermined luminance) correspondingly to a current amount (for example, a size of a driving current) supplied from the first power line PL1 to the second power line PL2 via the sub-pixel circuit SPC.

The light emitting element LD may be selected as an organic light emitting diode. In some aspects, the light emitting element LD may be selected as an inorganic light emitting diode such as, for example, a micro light emitting diode (LED) or a quantum dot LED. In some aspects, the light emitting element LD may be an element configured of a composite of an organic material and an inorganic material. In FIG. 3, the sub-pixel PXij is illustrated as including a single light emitting element LD, but in another embodiment, the sub-pixel PXij may include a plurality of light emitting elements LD, and the plurality of light emitting elements LD may be connected to each other in series, parallel, or series-parallel.

Figure 4:
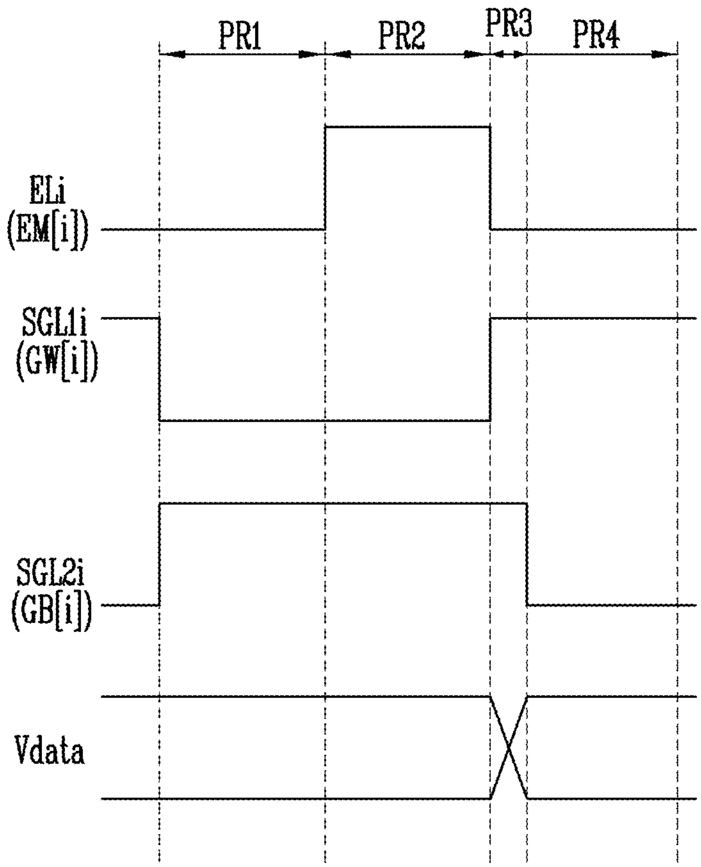
FIG. 4 is a timing diagram illustrating an embodiment of a method of driving the sub-pixel illustrated in FIG. 3.

FIG. 4 is a timing diagram illustrating an embodiment of a method of driving the sub-pixel illustrated in FIG. 3. FIG. 4 illustrates an example of signals supplied to the sub-pixel SPij disposed in the i-th row (i is an integer greater than or equal to 1 and less than or equal to m) and the j-th column (j is an integer greater than or equal to 1 and less than or equal to n) among the sub-pixels SP of FIG. 1.

Referring to FIGS. 1, 3, and 4, the gate driver 120 may supply the emission control signal EM[i] of a turn-on level (for example, a low level) to the i-th emission control line ELi during a first period PR1, a third period PR3, and a fourth period PR4. In some aspects, the gate driver 120 may supply the emission control signal EM[i] of a turn-off level (for example, a high level) to the i-th emission control line ELi during a second period PR2.

The gate driver 120 may supply the first gate signal GW[i] of the turn-on level (for example, a low level) to the first sub-gate line SGL1*i* during the first period PR1 and the second period PR2. In some aspects, the gate driver 120 may supply the first gate signal GW[i] of a turn-off level (for example, a high level) to the first sub-gate line SGL1*i* during the third period PR3 and the fourth period PR4.

The gate driver 120 may supply the second gate signal GB[i] of the turn-on level (for example, a high level) to the second sub-gate line SGL2*i* during the first to third periods PR1 to PR3. In some aspects, the gate driver 120 may supply the second gate signal GB[i] of a turn-off level (for example, a low level) to the second sub-gate line SGL2*i* during the fourth period PR4.

The data driver 130 may supply the data signal (or the data voltage Vdata) to the j-th data line DLj during the first to fourth periods PR1 to PR4.

The first period PR1 is a period in which the initialization voltage Vint is supplied to the third node N3, the data signal (or the data voltage Vdata) is supplied to the second node N2, and the first driving voltage VDD is supplied to the first node N1.

The second period PR2 is a period in which the initialization voltage Vint is supplied to the third node N3, and the data signal (or the data voltage Vdata) is supplied to the second node N2. During the second period PR2, a threshold voltage of the first transistor TR1 may be stored in the first capacitor C1. The gate driver 120 may supply the emission control signal EM[i] of the turn-off level to the third transistor T3, which may turn off the third transistor T3 and accordingly decrease a voltage applied to the first node N1, which may cause the threshold voltage of the first transistor TR1 to be stored in the first capacitor C1.

The third period PR3 is a period in which the data signal (or the data voltage Vdata) is supplied to the second node N2, the first driving voltage VDD is supplied to the first node N1, and the second node N2 is floated (or a constant voltage is not applied). The gate driver 120 may supply the first gate signal GW[i] of the turn-off level to the second transistor T2, which may turn off the second transistor T2 and accordingly cause the second node N2 to be floated.

In the fourth period PR4, the first driving voltage VDD may be supplied to the first node N1. The fourth period PR4 is a period in which the light emitting element LD emits light with a luminance corresponding to a current amount supplied from the first transistor TR1.

When the fourth transistor TR4 is turned off in the fourth period PR4, the third capacitor C3 may decrease a voltage of the second node N2 by a coupling effect. In other words, a gate voltage of the first transistor TR1 may be decreased. In some cases, controlling the light emitting element LD to emit light with a desired luminance may include increasing the size of the data signal Vdata supplied to the second node N2, which may lead to a problem of increased power consumption by the display device 100.

The sub-pixel SPij according to embodiments of the disclosure may include the fourth capacitor C4 between the second node N2 and the fourth node N4. During the fourth period PR4, the third transistor TR3 may be in a turn-off state, and the fourth capacitor C4 may increase the voltage of the second node N2 by the coupling effect.

When capacitances of the third capacitor C3 and the fourth capacitor C4 are substantially equal, a decrease amount of a voltage supplied to the second node N2 by the third capacitor C3 and an increase amount of the voltage supplied to the second node N2 by the fourth capacitor C4 may be substantially equal. As the fourth capacitor C4 offsets the decrease in the voltage at the second node N2 by the third capacitor C3, the offset may prevent the described problem of increasing the size of the data signal Vdata supplied to the second node N2 in association with controlling the light emitting element LD to emit light with a desired luminance. In addition through the features and techniques described herein, a problem of increased power consumption by the display device 100 may be prevented.

FIGS. 5 to 8 are circuit diagrams illustrating an operation process of the sub-pixel of FIG. 3 according to the signals of FIG. 4.

Figure 5:
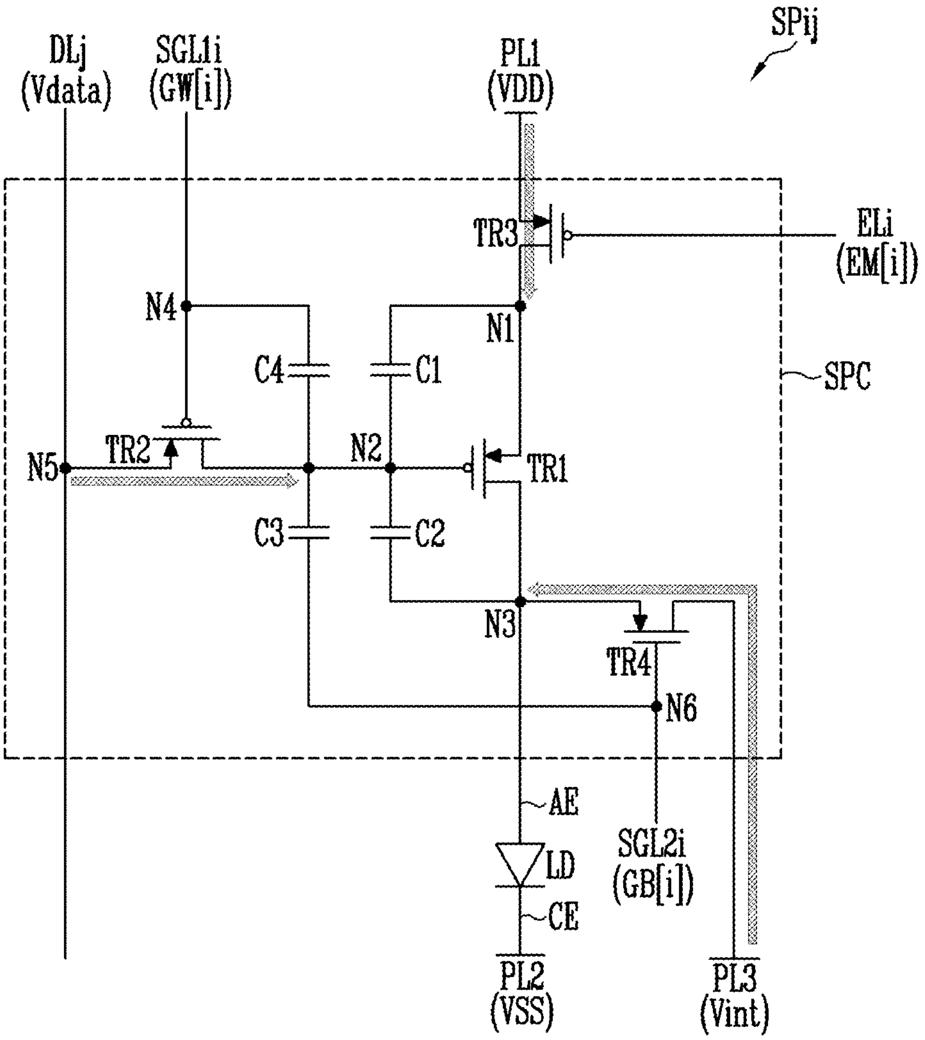
FIGS. 5 to 8 are circuit diagrams illustrating an operation process of the sub-pixel of FIG. 3 according to signals of FIG. 4.

Referring to FIG. 5, the gate driver 120 may supply the emission control signal EM[i] of the turn-on level to the emission control line ELi during the first period PR1. Accordingly, the third transistor TR3 may be turned on.

The gate driver 120 may supply the first gate signal GW[i] of the turn-on level to the first sub-gate line SGL1*i* during the first period PR1. Accordingly, the second transistor TR2 may be turned on.

The gate driver 120 may supply the second gate signal GB[i] of the turn-on level to the second sub-gate line SGL2*i* during the first period PR1. Accordingly, the fourth transistor TR4 may be turned on.

The first period PR1 is a period in which the initialization voltage Vint is supplied to the third node N3, the data signal (or the data voltage Vdata) is supplied to the second node N2, and the first driving voltage VDD is supplied to the first node N1.

Figure 6:
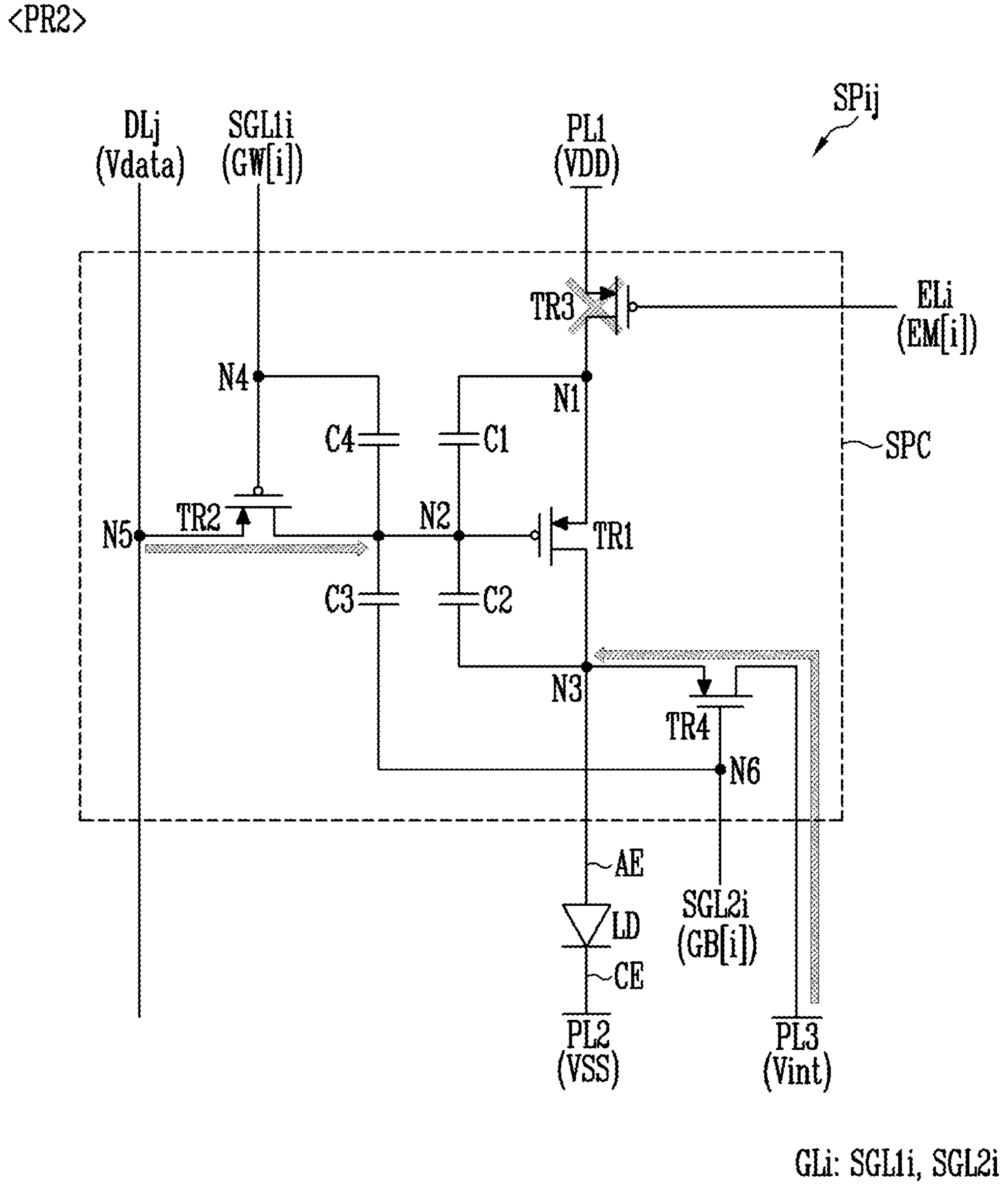

Referring to FIG. 6, the gate driver 120 may supply the emission control signal EM[i] of the turn-off level to the emission control line ELi during the second period PR2. Accordingly, the third transistor TR3 may be turned off.

The gate driver 120 may supply the first gate signal GW[i] of the turn-on level to the first sub-gate line SGL1*i* during the second period PR2. Accordingly, the second transistor TR2 may maintain a turn-on state.

The gate driver 120 may supply the second gate signal GB[i] of the turn-on level to the second sub-gate line SGL2*i* during the second period PR2. Accordingly, the fourth transistor TR4 may maintain a turn-on state.

The second period PR2 is a period in which the initialization voltage Vint is supplied to the third node N3, and the data signal (or the data voltage Vdata) is supplied to the second node N2. During the second period PR2, the threshold voltage of the first transistor TR1 may be stored in the first capacitor C1. The gate driver 120 may supply the emission control signal EM[i] of the turn-off level to the third transistor T3, which may turn off the third transistor T3 and accordingly decrease the voltage applied to the first node N1, which may cause the threshold voltage of the first transistor TR1 to be stored in the first capacitor C1.

Figure 7:
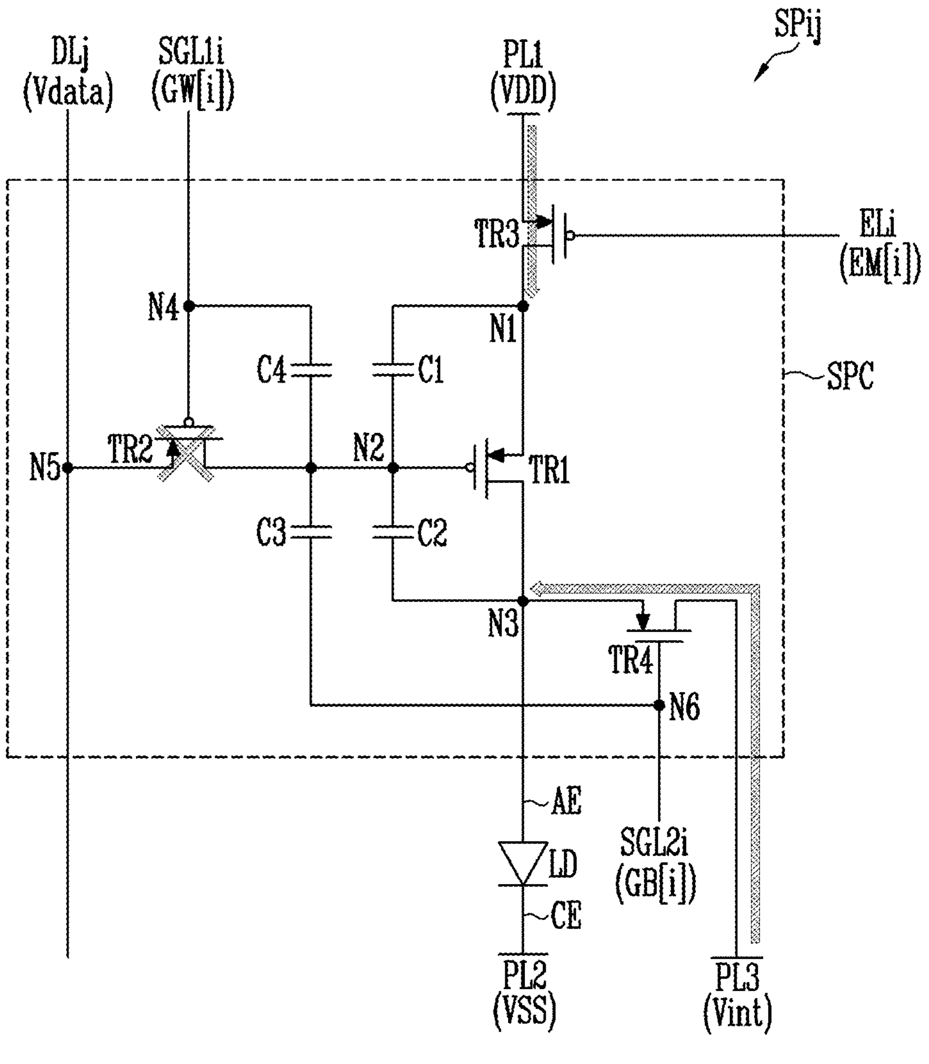

Referring to FIG. 7, the gate driver 120 may supply the emission control signal EM[i] of the turn-on level to the emission control line ELi during the third period PR3. Accordingly, the third transistor TR3 may be turned on.

The gate driver 120 may supply the first gate signal GW[i] of the turn-off level to the first sub-gate line SGL1*i* during the third period PR3. Accordingly, the second transistor TR2 may be turned off.

The gate driver 120 may supply the second gate signal GB[i] of the turn-on level to the second sub-gate line SGL2*i* during the third period PR3. Accordingly, the fourth transistor TR4 may maintain a turn-on state.

The third period PR3 is a period in which the data signal (or the data voltage Vdata) is supplied to the second node N2, the first driving voltage VDD is supplied to the first node N1, and the second node N2 is floated (or a constant voltage is not applied). The gate driver 120 may supply the first gate signal GW[i] of the turn-off level to the second transistor T2, which may turn off the second transistor T2 and accordingly cause the second node N2 to be floated.

Figure 8:
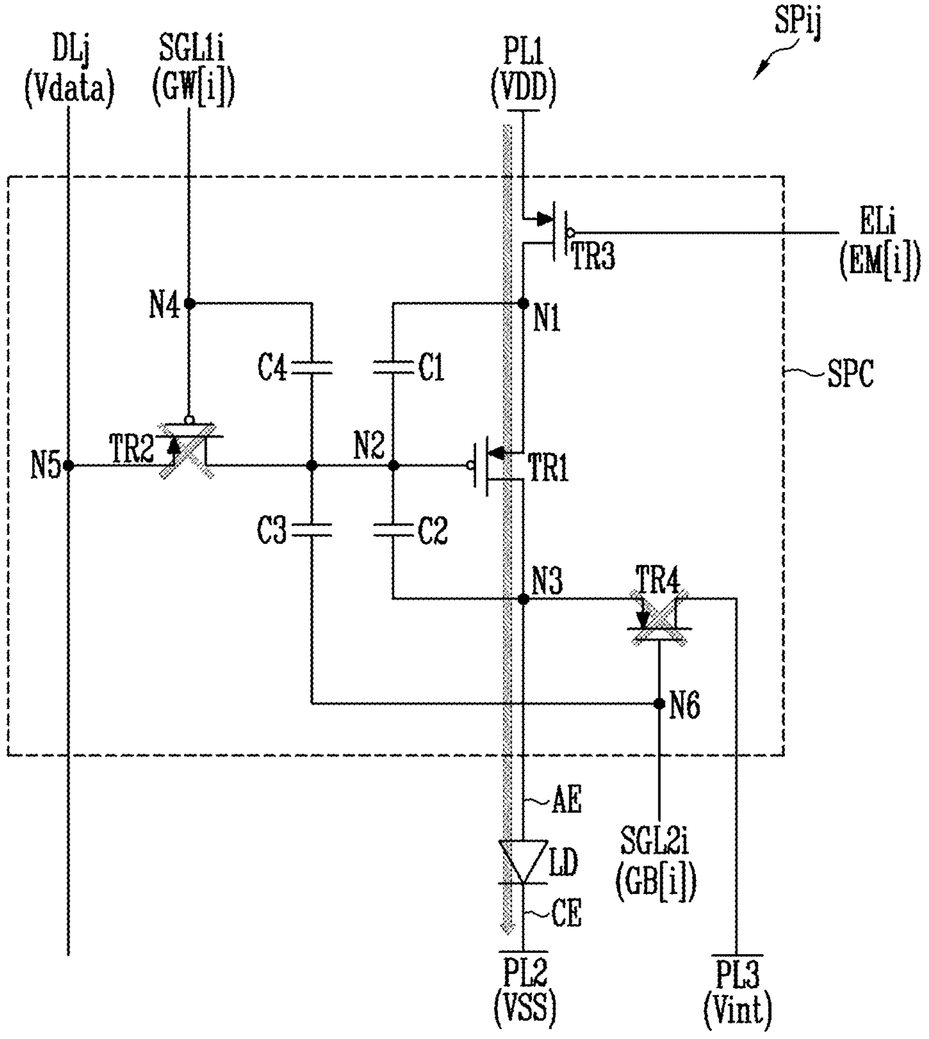

Referring to FIG. 8, the gate driver 120 may supply the emission control signal EM[i] of the turn-on level to the emission control line ELi during the fourth period PR4. Accordingly, the third transistor TR3 may maintain a turn-on state.

The gate driver 120 may supply the first gate signal GW[i] of the turn-off level to the first sub-gate line SGL1*i* during the fourth period PR4. Accordingly, the second transistor TR2 may maintain a turn-off state.

The gate driver 120 may supply the second gate signal GB[i] of the turn-off level to the second sub-gate line SGL2*i* during the fourth period PR4. Accordingly, the fourth transistor TR4 may be turned off.

In the fourth period PR4, the first driving voltage VDD may be supplied to the first node N1. The fourth period PR4 is a period in which the light emitting element LD emits light with a luminance corresponding to a current amount supplied from the first transistor TR1.

When the fourth transistor TR4 is turned off in the fourth period PR4, the third capacitor C3 may decrease the voltage of the second node N2 by the coupling effect. In other words, the gate voltage of the first transistor TR1 may be decreased. In some cases, controlling the light emitting element LD to emit light with a desired luminance may include increasing the size of the data signal Vdata supplied to the second node N2, which may lead to a problem of increased power consumption by the display device 100.

The sub-pixel SPij according to embodiments of the disclosure may include the fourth capacitor C4 between the second node N2 and the fourth node N4. During the fourth period PR4, the third transistor TR3 may be in a turn-off state, and the fourth capacitor C4 may increase the voltage of the second node N2 by the coupling effect.

When capacitances of the third capacitor C3 and the fourth capacitor C4 are substantially equal, a decrease amount of a voltage supplied to the second node N2 by the third capacitor C3 and an increase amount of the voltage supplied to the second node N2 by the fourth capacitor C4 may be substantially equal. As the fourth capacitor C4 offsets the decrease of the voltage of the second node N2 by the third capacitor C3, the offset may prevent the described problem of increasing the size of the data signal Vdata supplied to the second node N2 in association with controlling the light emitting element LD to emit light with a desired luminance. In some aspects, through the described features and techniques, a problem of increased power consumption by the display device 100 may be prevented.

Figure 9:
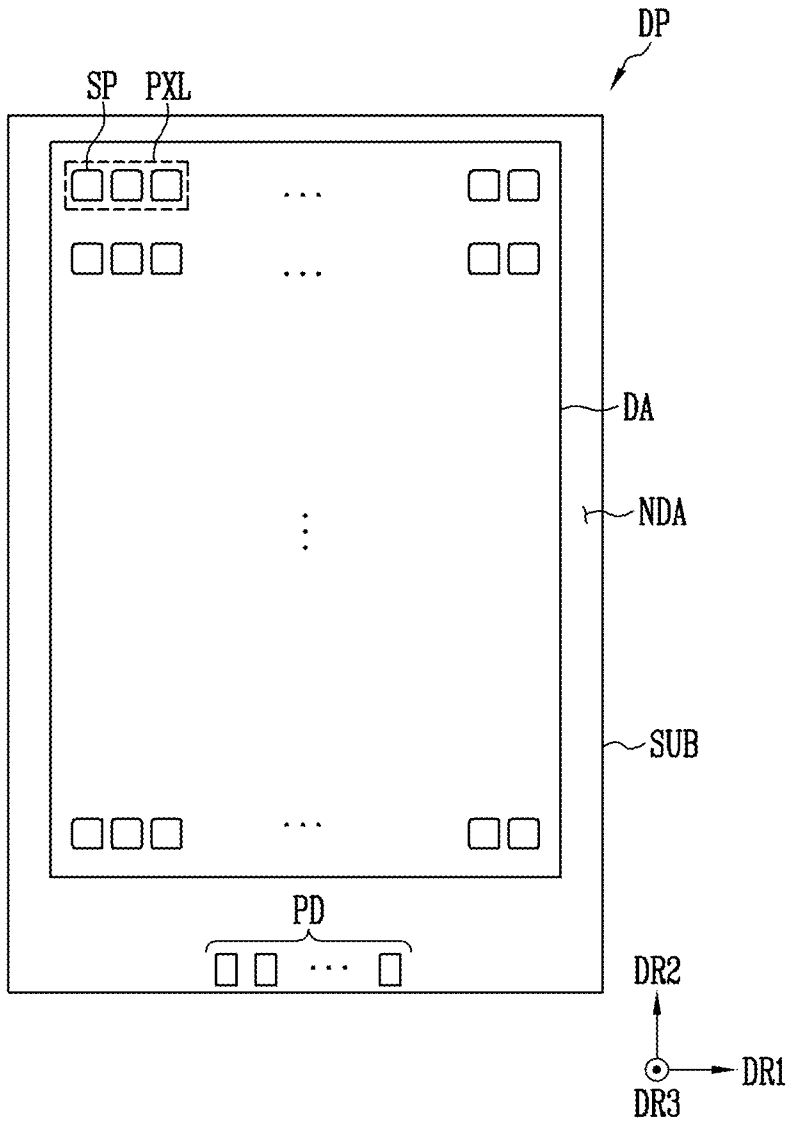
FIG. 9 is a plan view illustrating an embodiment of a display panel of FIG. 1.

FIG. 9 is a plan view illustrating an embodiment of the display panel of FIG. 1.

Referring to FIG. 9, an embodiment DP of the display panel 110 of FIG. 1 may include a display area DA and a non-display area NDA. The display panel DP displays an image through the display area DA. The non-display area NDA is disposed around the display area DA.

The display panel DP may include a substrate SUB, the sub-pixels SP, and pads PD.

When the display panel DP is used as a display screen of a head mounted display (HMD), a virtual reality (VR) device, a mixed reality (MR) device, an augmented reality (AR) device, or the like, the display panel DP may be positioned very close to user's eyes. In this case, sub-pixels SP of a relatively high integration degree may be implemented in the display panel DP. In order to increase an integration degree of the sub-pixels SP, the substrate SUB may be provided as a silicon substrate. The sub-pixels SP and/or the display panel DP may be formed on the substrate SUB, which is the silicon substrate. The display device 100 (refer to FIG. 1) including the display panel DP formed on the substrate SUB, which is the silicon substrate, may be referred to as an OLED on silicon (OLEDOS) display device.

The sub-pixels SP are disposed in the display area DA on the substrate SUB. The sub-pixels SP may be arranged in a matrix shape along a first direction DR1 and a second direction DR2 crossing the first direction DR1. However, embodiments are not limited thereto. For example, the sub-pixels SP may be arranged in a zigzag shape along the first direction DR1 and the second direction DR2. For example, the sub-pixels SP may be arranged in a PENTILE™ shape. The first direction DR1 may be a row direction, and the second direction DR2 may be a column direction.

Two or more sub-pixels among the plurality of sub-pixels SP may configure one pixel PXL.

A component for controlling the sub-pixels SP may be disposed in the non-display area NDA on the substrate SUB. For example, lines connected to the sub-pixels SP, such as, for example, the first to m-th gate lines GL1 to GLm and the first to n-th data lines DL1 to DLn of FIG. 1, may be disposed in the non-display area NDA.

At least one of the gate driver 120, the data driver 130, the voltage generator 140, the controller 150, and the temperature sensor 160 of FIG. 1 may be integrated in the non-display area NDA of the display panel DP. In embodiments, the gate driver 120 of FIG. 1 may be mounted on the display panel DP and may be disposed in the non-display area NDA. In other embodiments, the gate driver 120 may be implemented as an integrated circuit separated from the display panel DP. In embodiments, the temperature sensor 160 may be disposed in the non-display area NDA to sense a temperature of the display panel DP.

The pads PD are disposed in the non-display area NDA on the substrate SUB. The pads PD may be electrically connected to the sub-pixels SP through lines. For example, the pads PD may be connected to the sub-pixels SP through the first to n-th data lines DL1 to DLn.

The pads PD may interface the display panel DP to other components of the display device 100 (refer to FIG. 1). In embodiments, voltages and signals supportive of an operation of components included in the display panel DP may be provided from the driver integrated circuit DIC of FIG. 1 through the pads PD. For example, the first to n-th data lines DL1 to DLn may be connected to the driver integrated circuit DIC through the pads PD. For example, the first and second power voltages VDD and VSS may be received from the driver integrated circuit DIC through the pads PD. In an example in which the gate driver 120 is mounted on the display panel DP, the gate control signal GCS may be transmitted from the driver integrated circuit DIC to the gate driver 120 through the pads PD.

In embodiments, a circuit board may be electrically connected to the pads PD using a conductive adhesive member such as, for example, an anisotropic conductive film. At this time, the circuit board may be a flexible circuit board (FPCB) or a flexible film having a flexible material. The driver integrated circuit DIC may be mounted on the circuit board and be electrically connected to the pads PD.

In embodiments, the display area DA may have various shapes. The display area DA may have a closed loop shape including straight and/or curved sides. For example, the display area DA may have shapes such as, for example, a polygon, a circle, a semicircle, and an ellipse.

In embodiments, the display panel DP may have a flat display surface. In other embodiments, the display panel DP may have a display surface that is at least partially round. In embodiments, the display panel DP may be bendable, foldable, or rollable. In these cases, the display panel DP and/or the substrate SUB may include materials having a flexible property.

Figure 10:
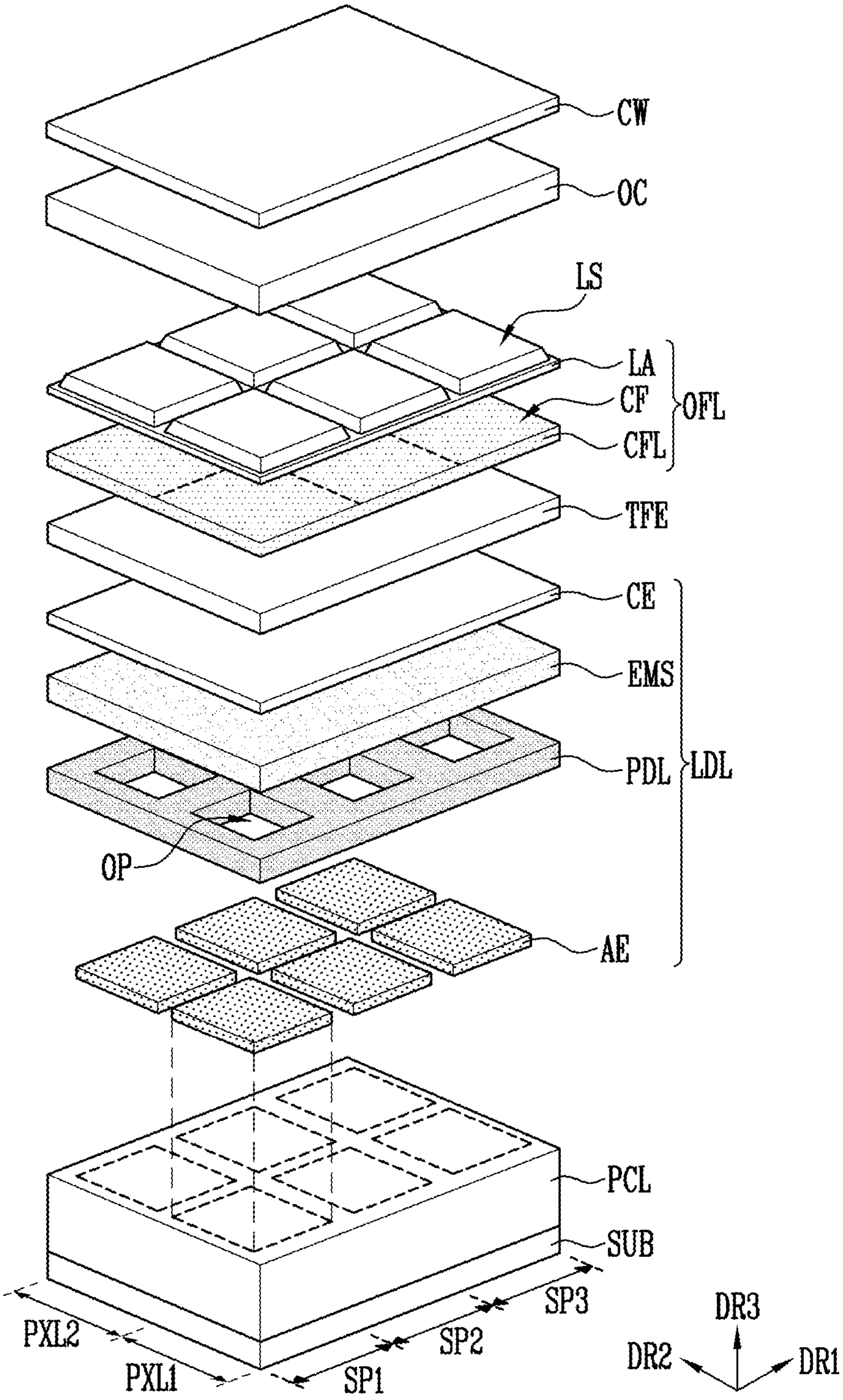
FIG. 10 is an exploded perspective view illustrating a portion of the display panel of FIG. 9.

FIG. 10 is an exploded perspective view illustrating a portion of the display panel of FIG. 9. In FIG. 10, for clarify and concise description, a portion of the display panel DP corresponding to two pixels PXL1 and PXL2 among the pixels PXL of FIG. 9 is schematically illustrated. A portion of the display panel DP corresponding to remaining pixels may be similarly configured.

Referring to FIGS. 9 and 10, each of the first and second pixels PXL1 and PXL2 may include first to third sub-pixels SP1, SP2, and SP3. However, embodiments are not limited thereto. For example, each of the first and second pixels PXL1 and PXL2 may include four sub-pixels or two sub-pixels.

In FIG. 10, the first to third sub-pixels SP1, SP2, and SP3 have quadrangle shapes when viewed from a third direction DR3 crossing the first and second directions DR1 and DR2, and have sizes equal to each other. However, embodiments are not limited thereto. The first to third sub-pixels SP1, SP2, and SP3 may be modified to have various shapes.

The display panel DP may include a substrate SUB, a pixel circuit layer PCL, a light emitting element layer LDL, an encapsulation layer TFE, an optical function layer OFL, an overcoat layer OC, and a cover window CW.

In embodiments, the substrate SUB may include a silicon wafer substrate formed using a semiconductor process. The substrate SUB may include a semiconductor material suitable for forming circuit elements. For example, the semiconductor material may include silicon, germanium, and/or silicon-germanium. The substrate SUB may be provided from a bulk wafer, an epitaxial layer, a silicon on insulator (SOI) layer, a semiconductor on insulator (SeOI) layer, or the like. In other embodiments, the substrate SUB may include a glass substrate. In still other embodiments, the substrate SUB may include a polyimide (PI) substrate.

The pixel circuit layer PCL is disposed on the substrate SUB. The substrate SUB and/or the pixel circuit layer PCL may include insulating layers and conductive patterns disposed between the insulating layers. The conductive patterns of the pixel circuit layer PCL may function as at least a portion of circuit elements, lines, and the like. The conductive patterns may include copper, but embodiments are not limited thereto.

The circuit elements may include the sub-pixel circuit SPC (refer to FIG. 2) for each of the first to third sub-pixels SP1, SP2, and SP3. The sub-pixel circuit SPC may include transistors and one or more capacitors. Each transistor may include a semiconductor portion including a source area, a drain area, and a channel area, and a gate electrode overlapping the semiconductor portion. In embodiments, when the substrate SUB is provided as a silicon substrate, the semiconductor portion may be included in the substrate SUB, and the gate electrode may be included in the pixel circuit layer PCL as a conductive pattern of the pixel circuit layer PCL. In embodiments, when the substrate SUB is provided as a glass substrate or a PI substrate, the semiconductor portion and the gate electrode may be included in the pixel circuit layer PCL. Each capacitor may include electrodes spaced apart from each other. For example, each capacitor may include electrodes spaced apart from each other on a plane defined by the first and second directions DR1 and DR2. For example, each capacitor may include electrodes spaced apart from each other in the third direction DR3 with an insulating layer interposed between the electrodes.

The lines of the pixel circuit layer PCL may include signal lines connected to each of the first to third sub-pixels SP1, SP2, and SP3, for example, a gate line, an emission control line, a data line, and the like. The lines may further include a line connected to the first power voltage node VDDN of FIG. 2. In some aspects, the lines may further include a line connected to the second power voltage node VSSN of FIG. 2.

The light emitting element layer LDL may include the anode electrodes AE, a pixel defining layer PDL, a light emitting structure EMS, and the cathode electrode CE.

The anode electrodes AE may be disposed on the pixel circuit layer PCL. The anode electrodes AE may contact the circuit elements of the pixel circuit layer PCL. The anode electrodes AE may include an opaque conductive material capable of reflecting light, but embodiments are not limited thereto.

The pixel defining layer PDL is disposed on the anode electrodes AE. The pixel defining layer PDL may include an opening OP exposing a portion of each of the anode electrodes AE. According to the opening OP of the pixel defining layer PDL, emission areas respectively corresponding to the first to third sub-pixels SP1 to SP3 may be defined. Alternatively, it may be understood that the emission areas corresponding to the first to third sub-pixels SP1 to SP3 are defined according to the anode electrodes AE. In an area adjacent to a boundary between neighboring sub-pixels, the pixel defining layer PDL may include a separator that causes formation of a discontinuous portion (discontinuity) in the light emitting structure EMS. In this case, it may be understood that the emission areas respectively corresponding to the first to third sub-pixels SP1 to SP3 are defined according to the separators of the pixel defining layer PDL.

In embodiments, the pixel defining layer PDL may include an inorganic material. In this case, the pixel defining layer PDL may include a plurality of stacked inorganic layers. For example, the pixel defining layer PDL may include silicon oxide (SiOx) and silicon nitride (SiNx). In other embodiments, the pixel defining layer PDL may include an organic material. However, a material of the pixel defining layer PDL is not limited thereto.

The light emitting structure EMS may be disposed on the anode electrodes AE exposed by the opening OP of the pixel defining layer PDL. The light emitting structure EMS may include a light emitting layer configured to generate light, an electron transport layer configured to transport an electron, a hole transport layer configured to transport a hole, and the like.

In embodiments, the light emitting structure EMS may fill the opening OP of the pixel defining layer PDL, and may be entirely disposed on the pixel defining layer PDL. In other words, the light emitting structure EMS may extend across the first to third sub-pixels SP1 to SP3. In this case, at least a portion of layers in the light emitting structure EMS may be disconnected or bent at boundaries between the first to third sub-pixels SP1 to SP3. However, embodiments are not limited thereto. For example, portions of the light emitting structure EMS corresponding to the first to third sub-pixels SP1 to SP3 may be separated from each other, and each of the portions may be disposed in the opening OP of the pixel defining layer PDL.

The cathode electrode CE may be disposed on the light emitting structure EMS. The cathode electrode CE may extend across the first to third sub-pixels SP1 to SP3. As described herein, the cathode electrode CE may be provided as a common electrode for the first to third sub-pixels SP1 to SP3.

The cathode electrode CE may be a thin metal layer having a thickness sufficient to transmit light emitted from the light emitting structure EMS. The cathode electrode CE may be formed of a metal material or a transparent conductive material to have a relatively thin thickness. In embodiments, the cathode electrode CE may include at least one of various transparent conductive materials including indium tin oxide, indium zinc oxide, indium tin zinc oxide, aluminum zinc oxide, gallium zinc oxide, zinc tin oxide, or gallium tin oxide. In other embodiments, the cathode electrode CE may include at least one of silver (Ag), magnesium (Mg), and a mixture thereof. However, a material of the cathode electrode CE is not limited thereto.

It may be understood that any of the anode electrodes AE, a portion of the light emitting structure EMS overlapping the anode electrodes AE, and a portion of the cathode electrode CE overlapping the anode electrodes AE may constitute one light emitting element LD (refer to FIG. 2). In other words, each of the light emitting elements of the first to third sub-pixels SP1 to SP3 may include one anode electrode, a portion of the light emitting structure EMS overlapping the anode electrode, and a portion of the cathode electrode CE overlapping the anode electrode. In each of the first to third sub-pixels SP1 to SP3, holes injected from the anode electrodes AE and electrons injected from the cathode electrode CE may be transported into the light emitting layer of the light emitting structure EMS to form excitons, and when the excitons transits from an excited state to a ground state, light may be generated. A luminance of light may be determined according to an amount of a current flowing through the light emitting layer. According to a configuration of the light emitting layer, a wavelength range of the generated light may be determined.

The encapsulation layer TFE is disposed on the cathode electrode CE. The encapsulation layer TFE may cover the light emitting element layer LDL and/or the pixel circuit layer PCL. The encapsulation layer TFE may be configured to prevent oxygen, moisture, and/or the like from permeating to the light emitting element layer LDL. In embodiments, the encapsulation layer TFE may include a structure in which one or more inorganic layers and one or more organic layers are alternately stacked. For example, the inorganic layer may include silicon nitride, silicon oxide, silicon oxynitride (SiOxNy), or the like. For example, the organic layer may include an organic insulating material such as, for example, acrylic resin, epoxy resin, phenol resin, polyamide resin, polyimide resin, unsaturated polyester resin, polyphenylenether resin, polyphenylenesulfide resin, or benzocyclobutene (BCB). However, materials of the organic layer and the inorganic layer of the encapsulation layer TFE are not limited thereto.

In order to improve an encapsulation efficiency of the encapsulation layer TFE, the encapsulation layer TFE may further include a thin film including aluminum oxide (AlOx). The thin film including the aluminum oxide may be positioned on an upper surface of the encapsulation layer TFE facing the optical functional layer OFL and/or a lower surface of the encapsulating layer TFE facing the light emitting element layer LDL.

The thin film including the aluminum oxide may be formed through atomic layer deposition (ALD) method. However, embodiments are not limited thereto. The encapsulation layer TFE may further include a thin film formed of at least one of various materials suitable for improving the encapsulation efficiency.

The optical functional layer OFL is disposed on the encapsulation layer TFE. The optical functional layer OFL may include a color filter layer CFL and a lens array LA.

The color filter layer CFL is disposed between the encapsulation layer TFE and the lens array LA. The color filter layer CFL is configured to filter the light emitted from the light emitting structure EMS and selectively output light of a wavelength range or a color corresponding to each sub-pixel. The color filter layer CFL may include color filters CF respectively corresponding to the first to third sub-pixels SP1 to SP3, and each of the color filters CF may pass light of a wavelength range corresponding to the corresponding sub-pixel. For example, the color filter corresponding to the first sub-pixel SP1 may pass red color light, the color filter corresponding to the second sub-pixel SP2 may pass green color light, and the color filter corresponding to the third sub-pixel SP3 may pass blue color light. According to the light emitted from the light emitting structure EMS of each sub-pixel, at least a portion of the color filters CF may be omitted.

The lens array LA is disposed on the color filter layer CFL. The lens array LA may include lenses LS corresponding to the first to third sub-pixels SP1 to SP3, respectively. Each of the lenses LS may improve light emission efficiency by outputting light emitted from the light emitting structure EMS to an intended path. The lens array LA may have a relatively high refractive index. For example, the lens array LA may have a refractive index greater than a refractive index of the overcoat layer OC. In embodiments, the lenses LS may include an organic material. In embodiments, the lenses LS may include an acrylic material. However, a material of the lenses LS is not limited thereto.

In embodiments, compared to the opening OP of the pixel defining layer PDL, at least a portion of the color filters CF of the color filter layer CFL and at least a portion of the lenses LS of the lens array LA may be shifted in a direction parallel to the plane defined by the first and second directions DR1 and DR2. Specifically, in a central area of the display area DA, a center of the color filter and a center of the lens may be aligned with or overlap with a center of the opening OP of the corresponding pixel defining layer PDL when viewed in the third direction DR3. For example, in the central area of the display area DA, the opening OP of the pixel defining layer PDL may completely overlap the corresponding color filter of the color filter layer CFL and the corresponding lens of the lens array LA. In an area adjacent to the non-display area NDA in the display area DA, the center of the color filter and the center of the lens may be shifted in a plane direction from the center of the opening OP of the corresponding pixel defining layer PDL when viewed in the third direction DR3. For example, in the area adjacent to the non-display area NDA in the display area DA, the opening OP of the pixel defining layer PDL may be partially overlap of the corresponding color filter of the color filter layer CFL and the corresponding lens of the lens array LA. Accordingly, at a center of the display area DA, the light emitted from the light emitting structure EMS may be efficiently output in a normal direction of a display surface. At an outskirt of the display area DA, the light emitted from the light emitting structure EMS may be efficiently output in a direction inclined by a predetermined angle with respect to the normal direction of the display surface.

The overcoat layer OC may be disposed on the lens array LA. The overcoat layer OC may cover the optical functional layer OFL, the encapsulation layer TFE, the light emitting structure EMS, and/or the pixel circuit layer PCL. The overcoat layer OC may include various materials suitable for protecting layers thereunder from a foreign substance such as, for example, dust or moisture. For example, the overcoat layer OC may include at least one of an inorganic insulating layer and an organic insulating layer. For example, the overcoat layer OC may include epoxy, but embodiments are not limited thereto. The overcoat layer OC may have a refractive index lower than the refractive index of the lens array LA.

The cover window CW may be disposed on the overcoat layer OC. The cover window CW is configured to protect layers thereunder. The cover window CW may have a refractive index greater than the refractive index of the overcoat layer OC. The cover window CW may include glass, but embodiments are not limited thereto. For example, the cover window CW may be an encapsulation glass configured to protect components disposed thereunder. In other embodiments, the cover window CW may be omitted.

Figure 11:
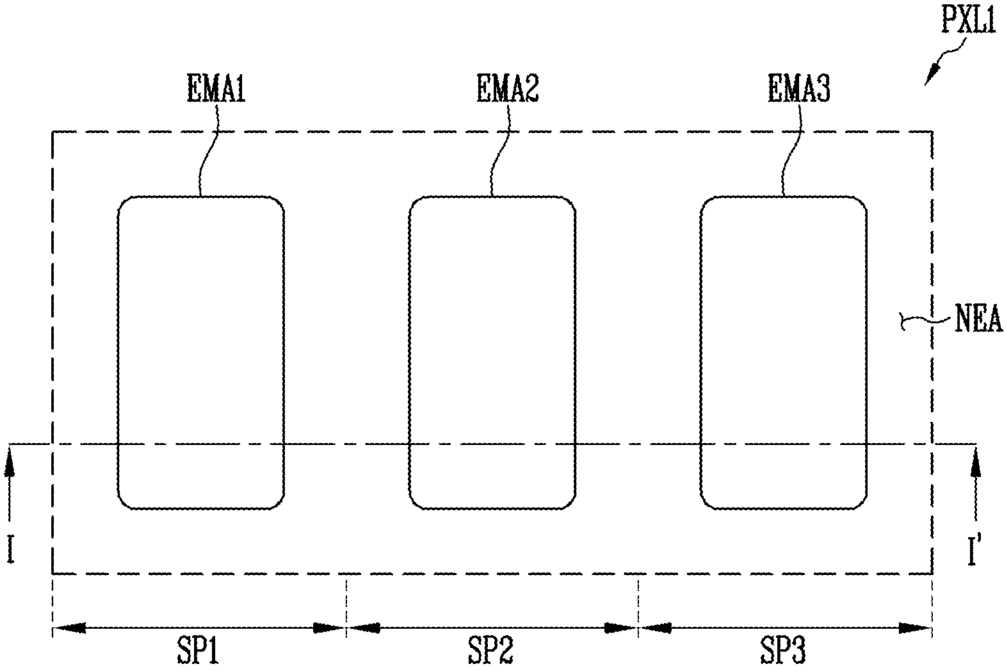
FIG. 11 is a plan view illustrating an embodiment of one of pixels of FIG. 10.

FIG. 11 is a plan view illustrating an embodiment of one of the pixels of FIG. 10. In FIG. 11, for clarify and concise description, the first pixel PXL1 among the first and second pixels PXL1 and PXL2 of FIG. 5 is schematically illustrated. The remaining pixels may be configured similarly to the first pixel PXL1.

Referring to FIGS. 10 and 11, the first pixel PXL1 may include the first to third sub-pixels SP1 to SP3 arranged in the first direction DR1.

The first sub-pixel SP1 may include a first emission area EMA1 and a non-emission area NEA around the first emission area EMA1. The second sub-pixel SP2 may include a second emission area EMA2 and a non-emission area NEA around the second emission area EMA2. The third sub-pixel SP3 may include a third emission area EMA3 and a non-emission area NEA around the third emission area EMA3.

The first emission area EMA1 may be an area where light is emitted from a portion of the light emitting structure EMS (refer to FIG. 10) corresponding to the first sub-pixel SP1. The second emission area EMA2 may be an area where light is emitted from a portion of the light emitting structure EMS corresponding to the second sub-pixel SP2. The third emission area EMA3 may be an area where light is emitted from a portion of the light emitting structure EMS corresponding to the third sub-pixel SP3.

Figure 12:
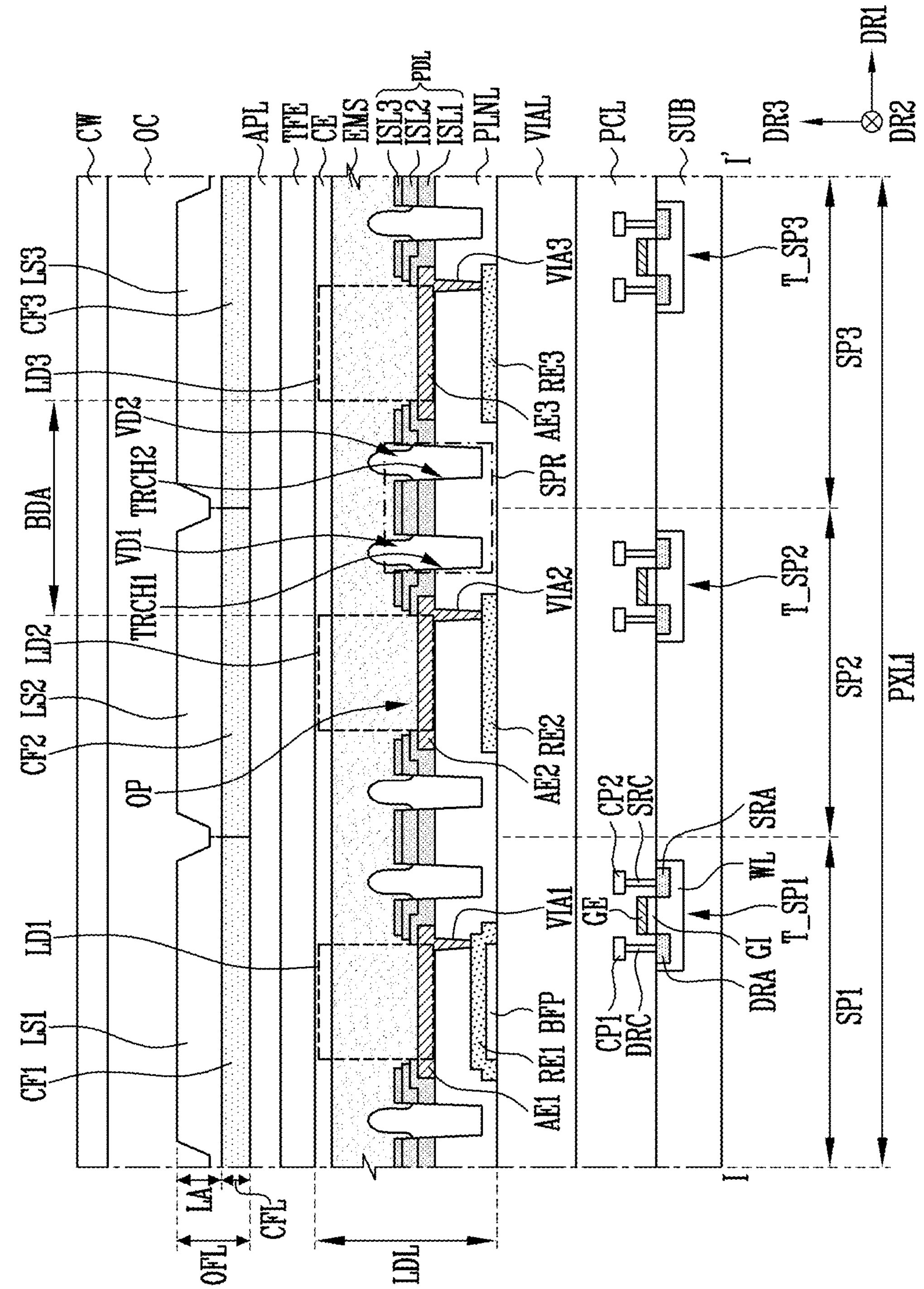
FIG. 12 is a cross-sectional view taken along line I-I' of FIG. 11 according to an embodiment of the disclosure.

FIG. 12 is a cross-sectional view taken along line I-I' of FIG. 11 according to an embodiment of the disclosure.

Referring to FIG. 12, the substrate SUB and the pixel circuit layer PCL disposed on the substrate SUB are provided.

The substrate SUB may include a silicon wafer substrate formed using a semiconductor process. For example, the substrate SUB may include silicon, germanium, and/or silicon-germanium.

The pixel circuit layer PCL is disposed on the substrate SUB. The substrate SUB and the pixel circuit layer PCL may include circuit elements of each of the first to third sub-pixels SP1 to SP3. For example, the substrate SUB and the pixel circuit layer PCL may include a transistor T_SP1 of the first sub-pixel SP1, a transistor T_SP2 of the second sub-pixel SP2, and a transistor T_SP3 of the third sub-pixel SP3. The transistor T_SP1 of the first sub-pixel SP1 may be one of the transistors included in the sub-pixel circuit SPC (refer to FIG. 2) of the first sub-pixel SP1, the transistor T_SP2 of the second sub-pixel SP2 may be one of the transistors included in the sub-pixel circuit SPC of the second sub-pixel SP2, and the transistor T_SP3 of the third sub-pixel SP3 may be one of the transistors included in the sub-pixel circuit SPC of the third sub-pixel SP3. In FIG. 12, for clarify and concise description, one of the transistors of each sub-pixel is illustrated, and the remaining circuit elements are omitted.

The transistor T_SP1 of the first sub-pixel SP1 may include a source area SRA, a drain area DRA, and a gate electrode GE.

The source area SRA and drain area DRA may be disposed in the substrate SUB. A well WL formed through an ion injection process may be disposed in the substrate SUB, and the source area SRA and the drain area DRA may be disposed spaced apart from each other in the well WL. An area between the source area SRA and the drain area DRA in the well WL may be defined as a channel area. The gate electrode GE may overlap the channel area between the source area SRA and the drain area DRA and may be disposed in the pixel circuit layer PCL. The gate electrode GE may be spaced apart from the well WL or the channel area by an insulating material such as, for example, a gate insulating layer GI. The gate electrode GE may include a conductive material.

A plurality of layers included in the pixel circuit layer PCL may include insulating layers and conductive patterns disposed between the insulating layers, and such conductive patterns may include first and second conductive patterns CP1 and CP2. The first conductive pattern CP1 may be electrically connected to the drain area DRA through a drain connection portion DRC passing through one or more insulating layers. The second conductive pattern CP2 may be electrically connected to the source area SRA through a source connection portion SRC passing through one or more insulating layers.

As the gate electrode GE and the first and second conductive patterns CP1 and CP2 are connected to different circuit elements and/or lines, the transistor T_SP1 of the first sub-pixel SP1 may be provided as one of the transistors of the first sub-pixel SP1.

Each of the transistor T_SP2 of the second sub-pixel SP2 and the transistor T_SP3 of the third sub-pixel SP3 may be configured similarly to the transistor T_SP1 of the first sub-pixel SP1.

As described herein, the substrate SUB and the pixel circuit layer PCL may include the circuit elements of each of the first to third sub-pixels SP1 to SP3.

A via layer VIAL is disposed on the pixel circuit layer PCL. The via layer VIAL may cover the pixel circuit layer PCL and may have an overall flat surface. The via layer VIAL is configured to planarize steps on the pixel circuit layer PCL. The via layer VIAL may include at least one of silicon oxide (SiOx), silicon nitride (SiNx), and silicon carbon nitride (SiCN), but embodiments are not limited thereto.

The light emitting element layer LDL is disposed on the via layer VIAL. The light emitting element layer LDL may include first to third reflective electrodes RE1 to RE3, a planarization layer PLNL, first to third anode electrodes AE1 to AE3, the pixel defining layer PDL, the light emitting structure EMS, and the cathode electrode CE.

On the via layer VIAL, the first to third reflective electrodes RE1 to RE3 are disposed in the first to third sub-pixels SP1 to SP3, respectively. Each of the first to third reflective electrodes RE1 to RE3 may contact the circuit element disposed in the pixel circuit layer PCL through a via passing through the via layer VIAL.

The first to third reflective electrodes RE1 to RE3 may function as a full mirror reflecting the light emitted from the light emitting structure EMS toward the display surface (or the cover window CW). The first to third reflective electrodes RE1 to RE3 may include metal materials suitable for reflecting light. The first to third reflective electrodes RE1 to RE3 may include at least one of aluminum (Al), silver (Ag), magnesium (Mg), platinum (Pt), palladium (Pd), gold (Au), nickel (Ni), neodymium (Nd), iridium (Ir), chromium (Cr), titanium (Ti), and an alloy of two or more materials selected from them.

In embodiments, a connection electrode may be disposed under each of the first to third reflective electrodes RE1 to RE3. The connection electrode may improve an electrical connection characteristic between a corresponding reflective electrode and the circuit element of the pixel circuit layer PCL. The connection electrode may have a multilayer structure. The multilayer structure may include titanium (Ti), titanium nitride (TiN), tantalum nitride (TaN), or the like, but embodiments are not limited thereto. In embodiments, a corresponding reflective electrode may be positioned between multiple layers of the connection electrode.

A buffer pattern BFP may be disposed under at least one of the reflective electrodes RE1 to RE3. The buffer pattern BFP may include an inorganic material such as, for example, silicon carbon nitride, but embodiments are not limited thereto. By disposing the buffer pattern BFP, a height of the third direction DR3 of a corresponding reflective electrode may be adjusted. For example, the buffer pattern BFP may be disposed between the first reflective electrode RE1 and the via layer VIAL to adjust a height of the first reflective electrode RE1.

The first to third reflective electrodes RE1 to RE3 may function as full mirrors, and the cathode electrode CE may function as a half mirror. For example, each of the first to third reflective electrodes RE1 to RE3 and the cathode electrode CE may provide a resonance structure in a corresponding sub-pixel. The light emitted from the light emitting layer of the light emitting structure EMS may be amplified by reciprocating between a corresponding reflective electrode and the cathode electrode CE, and the amplified light may be output through the cathode electrode CE. As described herein, a distance between each reflective electrode and the cathode electrode CE may be understood as a resonance distance for the light emitted from the light emitting layer of the corresponding light emitting structure EMS.

The first sub-pixel SP1 may have a resonance distance shorter than the resonance distance of other sub-pixels by the buffer pattern BFP. The resonance distance may be adjusted as described herein, and the adjustment of the resonance distance may support effective and efficient amplification of light of a specific wavelength range (for example, red color). Accordingly, the first sub-pixel SP1 may effectively and efficiently output light of a corresponding wavelength range.

In FIG. 12, the buffer pattern BFP provided to the first sub-pixel SP1 and is not provided to the second and third sub-pixels SP2 and SP3, but embodiments are not limited thereto. The buffer pattern may also be provided in at least one of the second and third sub-pixels SP2 and SP3 to adjust the resonance distance of at least one of the second and third sub-pixels SP2 and SP3. For example, the first to third sub-pixels SP1 to SP3 may correspond to red, green, and blue, respectively, a distance between the first reflective electrode RE1 and the cathode electrode CE may be shorter than a distance between the second reflective electrode RE2 and the cathode electrode CE, and the distance between the second reflective electrode RE2 and the cathode electrode CE may be shorter than a distance between the third reflective electrode RE3 and the cathode electrode CE.

In order to planarize steps between the first to third reflective electrodes RE1 to RE3, the planarization layer PLNL may be disposed on the via layer VIAL and the first to third reflective electrodes RE1 to RE3. The planarization layer PLNL may generally cover the first to third reflective electrodes RE1 to RE3 and the via layer VIAL, and may have a flat surface. In embodiments, the planarization layer PLNL may be omitted.

On the planarization layer PLNL, first to third anode electrodes AE1 to AE3 respectively overlapping the first to third reflective electrodes RE1 to RE3 are disposed. The first to third anode electrodes AE1 to AE3 may have shapes similar to those of the first to third emission areas EMA1 to EMA3 of FIG. 5 when viewed in the third direction DR3. The first to third anode electrodes AE1 to AE3 are respectively connected to the first to third reflective electrodes RE1 to RE3. The first anode electrode AE1 may be connected to the first reflective electrode RE1 through a first via VIA1 passing through the planarization layer PLNL. The second anode electrode AE2 may be connected to the second reflective electrode RE2 through a second via VIA2 passing through the planarization layer PLNL. The third anode electrode AE3 may be connected to the third reflective electrode RE3 through a third via VIA3 passing through the planarization layer PLNL.

In embodiments, the first to third anode electrodes AE1 to AE3 may include at least one of transparent conductive materials such as, for example, indium tin oxide (ITO), indium zinc oxide (IZO), zinc oxide (ZnOx), indium gallium zinc oxide (IGZO), and indium tin zinc oxide (ITZO). However, a material of the first to third anode electrodes AE1 to AE3 is not limited thereto. For example, the first to third anode electrodes AE1 to AE3 may include titanium nitride.

The pixel defining layer PDL is disposed on portions of the first to third anode electrodes AE1 to AE3 and the planarization layer PLNL. The pixel defining layer PDL has the opening OP exposing a portion of each of the first to third anode electrodes AE1 to AE3. An area overlapping the pixel defining layer PDL may be understood as a boundary area BDA between neighboring sub-pixels.

In embodiments, the pixel defining layer PDL may include a plurality of inorganic insulating layers. Each of the plurality of inorganic insulating layers may include at least one of silicon oxide (SiOx) and silicon nitride (SINx). For example, the pixel defining layer PDL may include a first inorganic insulating layer ISL1, a second inorganic insulating layer ISL2, and a third inorganic insulating layer ISL3 that are sequentially stacked. The first to third inorganic insulating layers ISL1 to ISL3 may include silicon nitride, silicon oxide, and silicon nitride, but embodiments are not limited thereto. The first to third inorganic insulating layers ISL1 to ISL3 may have a step-shaped cross-section in an area adjacent to the opening OP.

The pixel defining layer PDL may include a separator SPR in the boundary area BDA between neighboring sub-pixels. In other words, the separator SPR may be provided in each of the boundary areas between the sub-pixels SP of FIG. 9.

The separator SPR may cause formation of a discontinuous portion in the light emitting structure EMS in the boundary area BDA. For example, the light emitting structure EMS may be disconnected or bent in the boundary area BDA due to the separator SPR. Therefore, the first to third emission areas EMA1 to EMA3 of FIG. 11 corresponding to the first to third sub-pixels SP1 to SP3 may be defined according to the separator SPR of the pixel defining layer PDL.

The separator SPR may be provided in or on the pixel defining layer PDL. The pixel defining layer PDL may include one or more trenches TRCH1 and TRCH2 as the separator SPR in the boundary area BDA. In embodiments, as illustrated in FIG. 12, one or more trenches TRCH1 and TRCH2 may pass through the pixel defining layer PDL and partially pass through the planarization layer PLNL. In other embodiments, one or more trenches TRCH1 and TRCH2 may pass through the pixel defining layer PDL and the planarization layer PLNL, and may partially pass through the via layer VIAL. In other embodiments, one or more trenches TRCH1 and TRCH2 may at least partially pass through the planarization layer PLNL and/or the via layer VIAL, and a portion of the pixel defining layer PDL may be disposed in one or more trenches TRCH1 and TRCH2.

In FIG. 12, the two trenches TRCH1 and TRCH2 are provided in the boundary area BDA. However, embodiments are not limited thereto. For example, the pixel defining layer PDL may include one trench in the boundary area BDA. Alternatively, the pixel defining layer PDL may include three or more trenches in the boundary area BDA.

Due to the first and second trenches TRCH1 and TRCH2, in the boundary area BDA, discontinuous portions such as, for example, a first void VD1 and a second void VD2 may be formed in the light emitting structure EMS. A portion of a plurality of layers stacked in the light emitting structure EMS may be disconnected or bent by the first and second voids VD1 and VD2. For example, at least one charge generation layer and at least one hole injection layer included in the light emitting structure EMS may be disconnected in the first and second voids VD1 and VD2. As described herein, portions of the light emitting structure EMS included in the first to third sub-pixels SP1 to SP3 may be at least partially separated due to the first and second trenches TRCH1 and TRCH2.

According to shapes of the first and second trenches TRCH1 and TRCH2, the discontinuous portions formed in the light emitting structure EMS may be variously changed.

In embodiments, the light emitting structure EMS may be formed through a process of vacuum deposition, inkjet printing, and the like. In this case, the same materials as the light emitting structure EMS may be positioned on bottom surfaces of the first and second trenches TRCH1 and TRCH2 adjacent to the via layer VIAL.

The pixel defining layer PDL may include an additional separator such that the light emitting structure EMS further includes a discontinuous portion adjacent to the boundary area BDA. In embodiments, the third inorganic insulating layer ISL3 of the uppermost portion among the first to third inorganic insulating layers ISL1 to ISL3 of the pixel defining layer PDL may have a width greater than a width of the second inorganic insulating layer ISL2 disposed directly thereunder. For example, the pixel defining layer PDL may have a "T" shape or "I" shape of cross-section in the boundary area BDA. According to a shape of the pixel defining layer PDL, a plurality of layers included in the light emitting structure EMS may be at least partially disconnected or bent in the boundary area BDA or in an area adjacent to the boundary area BDA.

The light emitting structure EMS may be disposed on the anode electrodes AE1 to AE3 exposed by the opening OP of the pixel defining layer PDL. The light emitting structure EMS may fill the opening OP of the pixel defining layer PDL and may be disposed entirely across the first to third sub-pixels SP1 to SP3. As described herein, the light emitting structure EMS may be at least partially disconnected or bent in the boundary area BDA by the separator SPR. Accordingly, when the display panel DP is operated, a current flowing out from each of the first to third sub-pixels SP1 to SP3 to a sub-pixel adjacent thereto through layers included in the light emitting structure EMS may decrease. Therefore, the first to third light emitting elements LD1 to LD3 may operate with relatively high reliability.

The cathode electrode CE may be disposed on the light emitting structure EMS. The cathode electrode CE may be commonly provided to the first to third sub-pixels SP1 to SP3. The cathode electrode CE may function as a half mirror that partially transmits and partially reflects the light emitted from the light emitting structure EMS.

The first anode electrode AE1, a portion of the light emitting structure EMS overlapping the first anode electrode AE1, and a portion of the cathode electrode CE overlapping the first anode electrode AE1 may configure the first light emitting element LD1. The second anode electrode AE2, a portion of the light emitting structure EMS overlapping the second anode electrode AE2, and a portion of the cathode electrode CE overlapping the second anode electrode AE2 may configure the second light emitting element LD2. The third anode electrode AE3, a portion of the light emitting structure EMS overlapping the third anode electrode AE3, and a portion of the cathode electrode CE overlapping the third anode electrode AE3 may configure the third light emitting element LD3.

The encapsulation layer TFE is disposed on the cathode electrode CE. The encapsulation layer TFE may prevent oxygen, moisture, and/or the like from permeating to the light emitting element layer LDL.

The optical functional layer OFL is disposed on the encapsulation layer TFE. In embodiments, the optical functional layer OFL may be attached to the encapsulation layer TFE through an adhesive layer APL. For example, the optical functional layer OFL may be separately manufactured and attached to the encapsulation layer TFE through the adhesive layer APL. The adhesive layer APL may further perform a function of protecting lower layers including the encapsulation layer TFE.

The optical functional layer OFL may include the color filter layer CFL and the lens array LA. The color filter layer CFL may include first to third color filters CF1 to CF3 respectively corresponding to the first to third sub-pixels SP1 to SP3. The first to third color filters CF1 to CF3 may pass light of different wavelength ranges. For example, the first to third color filters CF1 to CF3 may pass light of red, green, and blue colors, respectively.

In embodiments, the first to third color filters CF1 to CF3 may partially overlap in the boundary area BDA. In other embodiments, the first to third color filters CF1 to CF3 may be spaced apart from each other, and a black matrix may be provided between the first to third color filters CF1 to CF3.

The lens array LA is disposed on the color filter layer CFL. The lens array LA may include first to third lenses LS1 to LS3 respectively corresponding to the first to third sub-pixels SP1 to SP3. Each of the first to third lenses LS1 to LS3 may improve light output efficiency by outputting light emitted from the first to third light emitting elements LD1 to LD3 to an intended path.

The overcoat layer OC may be disposed on the lens array LA. The overcoat layer OC is configured to protect upper layers of the lens array LA from a foreign substance such as, for example, dust or moisture. The cover window CW may be disposed on the overcoat layer OC.

Figure 13:
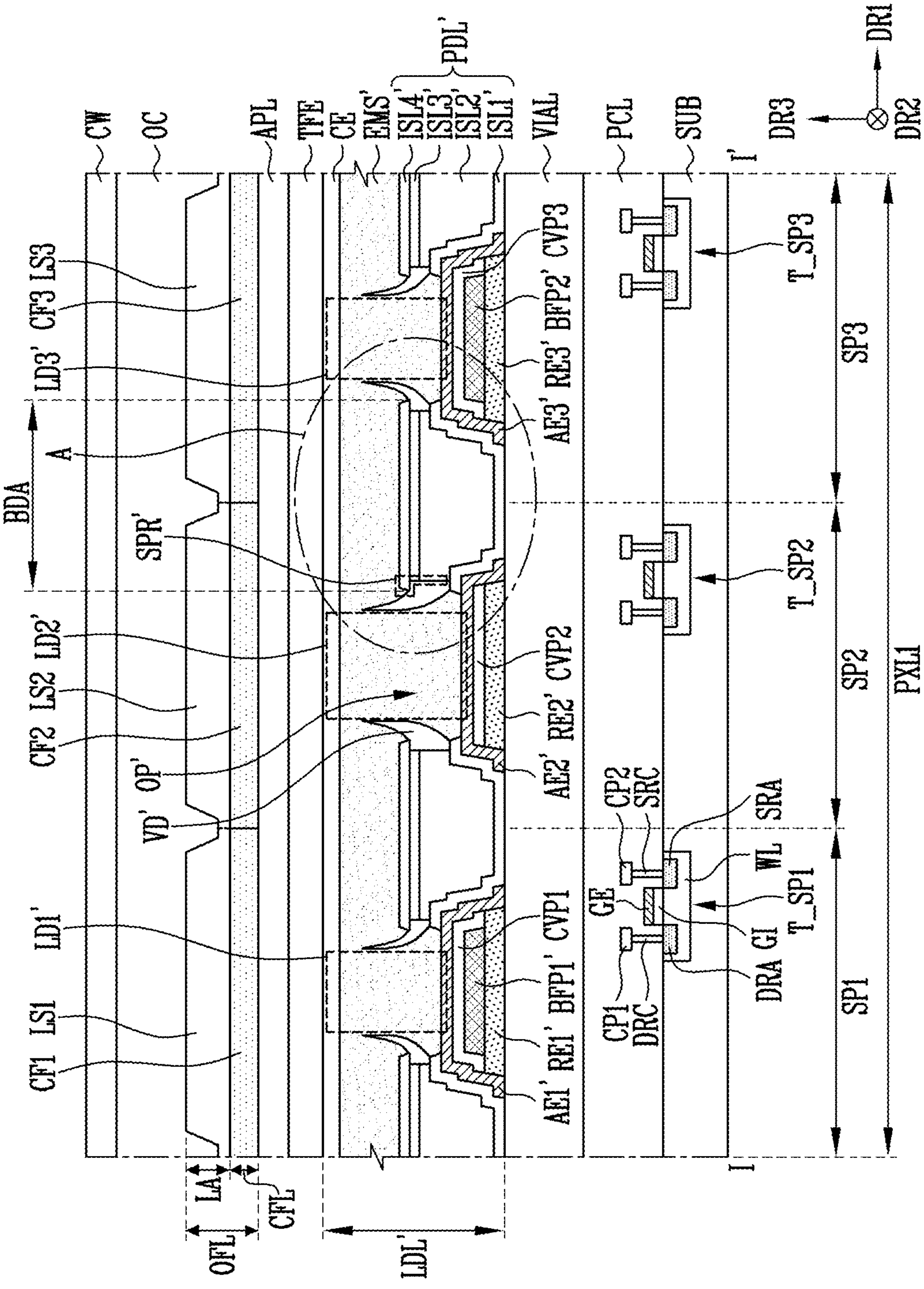
FIG. 13 is a cross-sectional view taken along line I-I' of FIG. 11 according to another embodiment of the disclosure.
Figure 14:
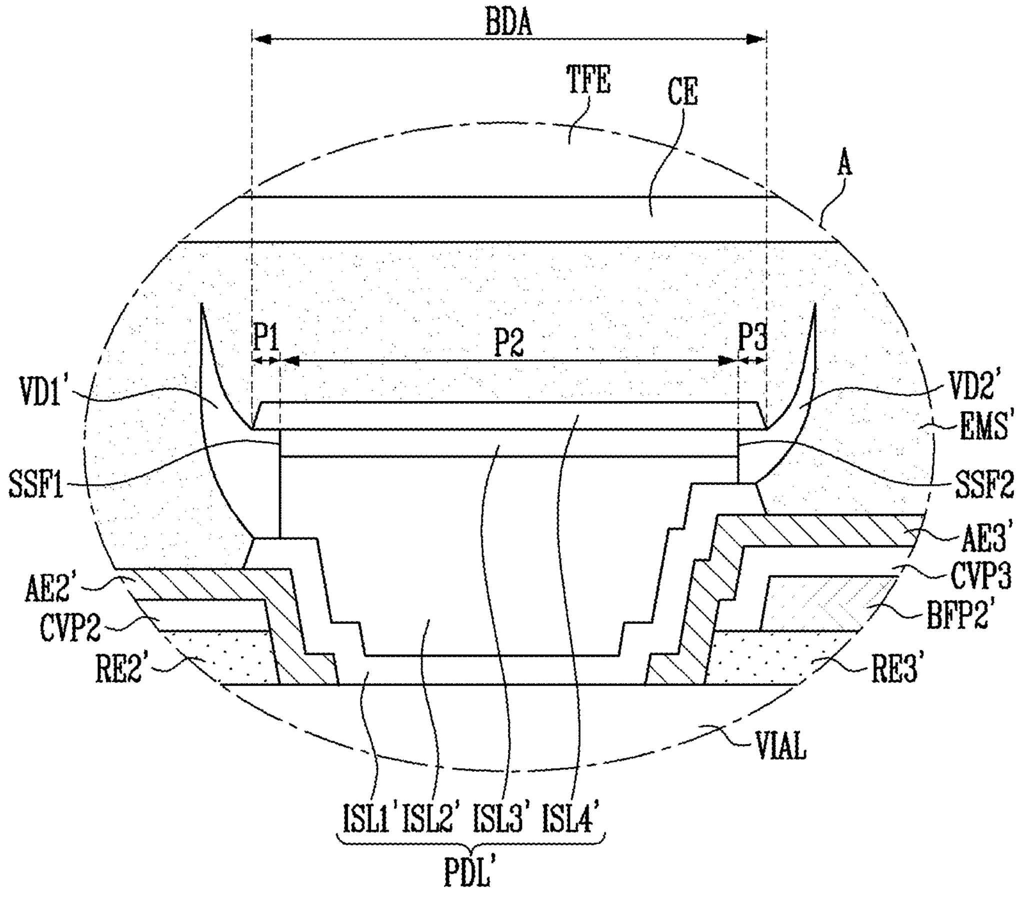
FIG. 14 is an enlarged view illustrating area A of FIG. 13.

FIG. 13 is a cross-sectional view taken along line I-I' of FIG. 11 according to another embodiment. FIG. 14 is an enlarged view illustrating area A of FIG. 13.

Referring to FIG. 13, a pixel circuit layer PCL and a via layer VIAL are disposed on a substrate SUB. The substrate SUB, the pixel circuit layer PCL, and the via layer VIAL of FIG. 13 are configured similarly to the substrate SUB, the pixel circuit layer PCL, and the via layer VIAL of FIG. 7, respectively. Hereinafter, an overlapping description is omitted.

A light emitting element layer LDL' is disposed on the via layer VIAL. The light emitting element layer LDL' may include first to third reflective electrodes RE1' to RE3', first and second buffer patterns BFP1' and BFP2', first to third cover patterns CVP1 to CVP3, first to third anode electrodes AE1' to AE3', a pixel defining layer PDL', a light emitting structure EMS', and a cathode electrode CE.

On the via layer VIAL, the first to third reflective electrodes RE1' to RE3' are respectively disposed in the first to third sub-pixels SP1 to SP3. Each of the first to third reflective electrodes RE1' to RE3' may contact a circuit element disposed in the pixel circuit layer PCL through a via passing through the via layer VIAL.

The first to third reflective electrodes RE1' to RE3' are configured to reflect light emitted from the light emitting structure EMS' toward the display surface (or the cover window CW). The first to third reflective electrodes RE1' to RE3' may include metal materials suitable for reflecting light. The first to third reflective electrodes RE1' to RE3' may include at least one of aluminum (Al), silver (Ag), magnesium (Mg), platinum (Pt), palladium (Pd), gold (Au), nickel (Ni), neodymium (Nd), iridium (Ir), chromium (Cr), titanium (Ti), and an alloy of two or more materials selected therefrom, but embodiments are not limited thereto.

In embodiments, a connection electrode may be further provided between each of the first to third reflective electrodes RE1' to RE3' and the via layer VIAL. The connection electrode may improve an electrical connection characteristic between a corresponding reflective electrode and the circuit elements of the pixel circuit layer PCL. The connection electrode may have a multilayer structure. The multilayer structure may include titanium (Ti), aluminum (Al), titanium nitride (TiN), tantalum nitride (TaN), and the like, but embodiments are not limited thereto. In embodiments, a corresponding reflective electrode may be positioned between multilayers of the connection electrode.

A buffer pattern may be disposed on at least one of the first to third reflective electrodes RE1' to RE3'. In embodiments, the first and second buffer patterns BFP1' and BFP2' may be disposed on the first and third reflective electrodes RE1' and RE3', respectively. Heights of the third direction DR3 of the first and third anode electrodes AE1' and AE3' may be adjusted by the first and second buffer patterns BFP1' and BFP2'. The first and second buffer patterns BFP1' and BFP2' may include inorganic material such as, for example, silicon oxide (SiOx) and silicon nitride (SiNx), but embodiments are not limited thereto.

The first to third cover patterns CVP1 to CVP3 may be disposed on the first to third reflective electrodes RE1' to RE3', respectively. In the first sub-pixel SP1, the first cover pattern CVP1 is disposed on the first reflective electrode RE1' and the first buffer pattern BFP1'. In the second sub-pixel SP1, the second cover pattern CVP2 is disposed on the second reflective electrode RE2'. In the third sub-pixel SP3, the third cover pattern CVP3 is disposed on the third reflective electrode RE3' and the second buffer pattern BFP2'. The first to third cover patterns CVP1 to CVP3 may be formed after the first and second buffer patterns BFP1' and BFP2' are formed during a manufacturing process. The first to third cover patterns CVP1 to CVP3 may include the same material as the first and second buffer patterns BFP1' and BFP2'. For example, the first to third cover patterns CVP1 to CVP3 may include an inorganic material such as, for example, silicon oxide (SiOx) and silicon nitride (SiNx), but embodiments are not limited thereto.

The first to third anode electrodes AE1' to AE3' are disposed on the first to third cover patterns CVP1 to CVP3, respectively. In embodiments, the first anode electrode AE1' may cover the first cover pattern CVP1, the first buffer pattern BFP1', and the first reflective electrode RE1'. The second anode electrode AE2' may cover the second cover pattern CVP2 and the second reflective electrode RE2'. The third anode electrode AE3' may cover the third cover pattern CVP3, the second buffer pattern BFP2', and the third reflective electrode RE3'.

The first to third anode electrodes AE1' to AE3' may be electrically connected to the first to third reflective electrodes RE1' to RE3', respectively. For example, each anode electrode may be connected to an end (or an edge) of a corresponding reflective electrode. However, embodiments are not limited thereto. In order to improve an electrical connection characteristic between the anode electrode and the reflective electrode, the anode electrode may be connected to the reflective electrode in various methods.

In embodiments, the first to third anode electrodes AE1' to AE3' may include at least one of transparent conductive materials such as, for example, indium tin oxide (ITO), indium zinc oxide (IZO), zinc oxide (ZnOx), indium gallium zinc oxide (IGZO), and indium tin zinc oxide (ITZO). However, a material of the first to third anode electrodes AE1' to AE3' is not limited thereto. For example, the first to third anode electrodes AE1' to AE3' may include titanium nitride.

The first to third anode electrodes AE1' to AE3' may have shapes similar to those of the first to third light emitting regions EMA1 to EMA3 of FIG. 6 when viewed in the third direction DR3.

The first to third anode electrodes AE1' to AE3' and the cathode electrode CE may partially reflect incident light. Light emitted from a light emitting layer of the light emitting structure EMS' may be amplified by reciprocating between a corresponding anode electrode and the cathode electrode CE and may be output through the cathode electrode CE. For example, each anode electrode and the cathode electrode CE may provide a resonance structure in a corresponding sub-pixel. In this case, a distance between each anode electrode and the cathode electrode CE may be understood as a resonance distance for a light emitted from a light emitting layer of a corresponding light emitting structure EMS'.

The first to third sub-pixels SP1 to SP3 may correspond to red, green, and blue, respectively. In this case, respective heights in the third direction DR3 of the first and third anode electrodes AE1' and AE3' may be greater than a height of the second anode electrode AE2' due to the first and second buffer patterns BFP1' and BFP2' (e.g., by amounts respectively equal to heights of the first and second buffer patterns BFP1' and BFP2'). Accordingly, the first and third sub-pixels SP1 and SP3 may respectively have resonance distances shorter than a resonance distance of the second sub-pixel SP2 due to the first and second buffer patterns BFP1' and BFP2' (e.g., by amounts respectively equal to heights of the first and second buffer patterns BFP1' and BFP2'). As described herein, a resonance distance of each sub-pixel may be adjusted such that light of a wavelength range of a corresponding color is effectively and efficiently amplified.

In FIG. 13, the first and second buffer patterns BFP1' and BFP2' are respectively disposed under the first and third anode electrodes AE1' and AE3', but embodiments are not limited thereto. For example, one of the first and second buffer patterns BFP1' and BFP2' may be omitted. As another example, both of the first and second buffer patterns BFP1' and BFP2' may be omitted. In this case, the resonance distance between each anode electrode and the cathode electrode CE may be the same. As still another example, a buffer pattern may be disposed under each of the first to third anode electrodes AE1' to AE3'. In this case, the buffer pattern disposed under each anode electrode may have different thicknesses, and thus the resonance distances between each anode electrode and the cathode electrode CE may be different from each other. As described herein, by providing a buffer pattern for adjusting a height of a corresponding anode electrode under at least one of the first to third anode electrodes AE1' to AE3', a resonance distance in each sub-pixel may be optimized.

The pixel defining layer PDL' is disposed on portions of the first to third anode electrodes AE1' to AE3' and the via layer VIAL. The pixel defining layer PDL' has an opening OP' that exposes a portion of each of the first to third anode electrodes AE1' to AE3'. An area overlapping the pixel defining layer PDL' may be understood as a boundary area BDA between neighboring sub-pixels.

The pixel defining layer PDL' may include a plurality of sequentially stacked inorganic insulating layers. Each of the plurality of inorganic insulating layers may include at least one of silicon oxide (SiOx) and silicon nitride (SINx).

However, embodiments are not limited thereto. For example, the pixel defining layer PDL' may include an organic insulating layer.

In embodiments, the pixel defining layer PDL' may include first to fourth inorganic insulating layers ISL1' to ISL4'. The first inorganic insulating layer ISL1' may cover portions of the first to third anode electrodes AE1' to AE3' and the via layer VIAL. The second inorganic insulating layer ISL2' is disposed on the first inorganic insulating layer ISL1', the third inorganic insulating layer ISL3' is disposed on the second inorganic insulating layer ISL2', and the fourth inorganic insulating layer ISL4' is disposed on the third inorganic insulating layer ISL3'. The first and third inorganic insulating layers ISL1' and ISL3' may include silicon nitride (SiNx), and the second and fourth inorganic insulating layers ISL2' and ISL4' may include silicon oxide (SiOx), but embodiments are not limited thereto. In embodiments, the first inorganic insulating layer ISL1' may be omitted.

The pixel defining layer PDL' may include a separator SPR' in the boundary area BDA between neighboring sub-pixels. The separator SPR' may cause a discontinuous portion such as, for example, a void VD' to be formed in the light emitting structure EMS'. Due to the discontinuous portion, at least a portion of layers included in the light emitting structure EMS' may be disconnected or bent.

The fourth inorganic insulating layer ISL4' may have a width greater than each of respective widths of the second and third inorganic insulating layers ISL2' and ISL3'. In this case, side surfaces of the second to fourth inorganic insulating layers ISL2' to ISL4' adjacent to the opening OP' may be provided as the separator SPR'.

Referring to FIG. 14 together with FIG. 13, the fourth inorganic insulating layer ISL4' may include first to third portions P1 to P3. The second portion P2 may completely overlap the second and third inorganic insulating layers ISL2' and ISL3'. The first portion P1 protrudes from the second portion P2 in a direction opposite to the first direction DR1. The third portion P3 protrudes from the second portion P2 in the first direction DR1. As described herein, a width of the fourth inorganic insulating layer ISL4' may be greater than each of respective widths of the second and third inorganic insulating layers ISL2' and ISL3'. For example, during a manufacturing process, the second and third inorganic insulating layers ISL2' and ISL3' may be undercut so as not to include a portion overlapping the first and third portions P1 and P3. For example, each of the first and third portions P1 and P3 of the fourth inorganic insulating layer ISL4' may have a shape of eaves on the second and third inorganic insulating layers ISL2' and ISL3'.

In the boundary area BDA, the second and third inorganic insulating layers ISL2' and ISL3' may have the same width. However, embodiments are not limited thereto, and the second and third inorganic insulating layers ISL2' and ISL3' may have different widths. For example, the second inorganic insulating layer ISL2' may have a width greater than a width of the third inorganic insulating layer ISL3'. As another example, the third inorganic insulating layer ISL3' may have a width greater than a width of the second inorganic insulating layer ISL2'.

In the second sub-pixel SP2, the first portion P1 of the fourth inorganic insulating layer ISL4' and a first side surface SSF1 of the second and third inorganic insulating layers ISL2' and ISL3' may be provided as one separator SPR'. Accordingly, a first void VD1' adjacent to the first portion P1 of the fourth inorganic insulating layer ISL4' in the light emitting structure EMS' may be formed. In the third sub-pixel SP3, the third portion P3 of the fourth inorganic insulating layer ISL4' and a second side surface SSF2 of the second and third inorganic insulating layers may be provided as another separator SPR'. Accordingly, a second void VD2' adjacent to the third portion P3 of the fourth inorganic insulating layer ISL4' in the light emitting structure EMS' may be formed.

A portion of a plurality of layers stacked in the light emitting structure EMS' may be disconnected or bent by the first and second voids VD1' and VD2'. For example, at least one charge generation layer and at least one hole injection layer included in the light emitting structure EMS' may be disconnected by the first and second voids VD1' and VD2'. As described herein, due to the separator SPR', portions of the light emitting structure EMS' included in the first to third sub-pixels SP1 to SP3 may be at least partially separated from each other.

The pixel defining layer PDL' may include an additional separator such that the light emitting structure EMS' further includes a discontinuous portion in the boundary area BDA. In embodiments, the pixel defining layer PDL' may include one or more trenches as a separator in the boundary area BDA. The trenches may pass through one or more of the first to fourth inorganic insulating layers ISL1' to ISL4'. Due to the trenches, a portion of the plurality of layers stacked in the light emitting structure EMS', for example, at least one charge generation layer and at least one hole injection layer, may be disconnected or bent. In embodiments, the light emitting structure EML' may have a structure in which three light emitting units, each including an light emitting layer, are stacked, and two charge generation layers may be disposed between the three light emitting units. In the example embodiments, the pixel defining layer PDL' may include one or more trenches in the boundary area BDA.

Referring to FIG. 13 again, the light emitting structure EMS' may be disposed on the anode electrodes AE exposed by the opening OP' of the pixel defining layer PDL'. The light emitting structure EMS' may fill the opening OP' of the pixel defining layer PDL' and may be disposed entirely over the first to third sub-pixels SP1 to SP3. As described herein, the light emitting structure EMS' may be disconnected or bent by the separator SPR' in the boundary area BDA or in an area adjacent to the boundary area BDA. Accordingly, when the display panel DP is operated, current flowing from each of the first to third sub-pixels SP1 to SP3 to a sub-pixel neighboring each of the first to third sub-pixels SP1 to SP3 through the layers included in the light emitting structure EMS' may be reduced. Therefore, first to third light emitting elements LD1' to LD3' may operate with relatively high reliability.

In embodiments, the light emitting structure EMS' may include two light emitting units sequentially stacked, and each of the light emitting units may include a light emitting layer configured to generate light according to an applied current. In other embodiments, the light emitting structure EMS' may include three light emitting units sequentially stacked, and each of the light emitting units may include a light emitting layer configured to generate light according to an applied current. In the example embodiments, a charge generation layer may be disposed between the light emitting units.

In embodiments, the light emitting structure EMS' may be formed through a process of vacuum deposition, inkjet printing, and the like.

The cathode electrode CE may be disposed on the light emitting structure EMS'. The cathode electrode CE may be commonly provided to the first to third sub-pixels SP1 to SP3.

The first anode electrode AE1', a portion of a light emitting structure EMS' overlapping the first anode electrode AE1', and a portion of the cathode electrode CE overlapping the first anode electrode AE1' may configure the first light emitting element LD1'. The second anode electrode AE2', a portion of the light emitting structure EMS' overlapping the second anode electrode AE2', and a portion of the cathode electrode CE overlapping the second anode electrode AE2' may configure the second light emitting element LD2'. The third anode electrode AE3', a portion of the light emitting structure EMS' overlapping the third anode electrode AE3', and a portion of the cathode electrode CE overlapping the third anode electrode AE3' may configure the third light emitting element LD3'.

The encapsulation layer TFE is disposed on the cathode electrode CE. The encapsulation layer TFE may prevent oxygen, moisture, and/or the like from penetrating into the light emitting element layer LDL'.

The adhesive layer APL, the optical functional layer OFL, the overcoat layer OC, and the cover window CW are disposed on the encapsulation layer TFE. The adhesive layer APL, the optical functional layer OFL, the overcoat layer OC, and the cover window CW are configured similarly to the adhesive layer APL, the optical functional layer OFL, the overcoat layer OC, and the cover window CW of FIG. 12, respectively. An overlapping description of these is omitted.

Figure 15:
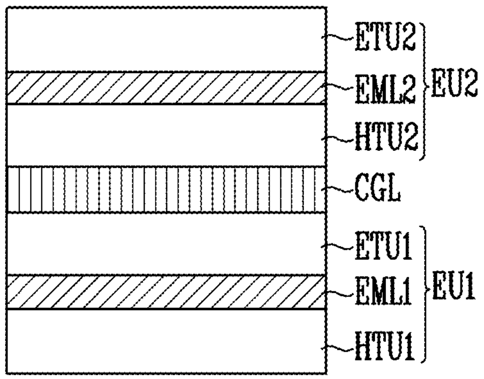
FIG. 15 is a cross-sectional view illustrating an embodiment of a portion of a light emitting structure included in one of first to third light emitting elements of FIG. 12 or 13.

FIG. 15 is a cross-sectional view illustrating an embodiment of a portion of a light emitting structure included in one of the first to third light emitting elements of FIG. 12 or 13.

Referring to FIG. 15, the light emitting structure may have a tandem structure in which first and second light emitting units EU1 and EU2 are stacked. The light emitting structure may be configured substantially equally in each of the first to third light emitting elements LD1 to LD3 of FIG. 12.

Each of the first and second light emitting units EU1 and EU2 may include at least one light emitting layer that generates light according to an applied current. The first light emitting unit EU1 may include a first light emitting layer EML1, a first electron transport unit ETU1, and a first hole transport unit HTU1. The first light emitting layer EML1 may be disposed between the first electron transport unit ETU1 and the first hole transport unit HTU1. The second light emitting unit EU2 may include a second light emitting layer EML2, a second electron transport unit ETU2, and a second hole transport unit HTU2. The second light emitting layer EML2 may be disposed between the second electron transport unit ETU2 and the second hole transport unit HTU2.

Each of the first and second hole transport units HTU1 and HTU2 may include at least one of a hole injection layer and a hole transport layer, and may further include a hole buffer layer, an electron blocking layer, and the like based on implementation. The first and second hole transport units HTU1 and HTU2 may have configurations equal to each other or different from each other.

Each of the first and second electron transport units ETU1 and ETU2 may include at least one of an electron injection layer and an electron transport layer, and may further include an electron buffer layer, a hole blocking layer, and the like based on implementation. The first and second electron transport units ETU1 and ETU2 may have configurations equal to each other or different from each other.

A connection layer, which may be provided in a form of a charge generation layer CGL, may be disposed between the first light emitting unit EU1 and the second light emitting unit EU2 to connect the first light emitting unit EU1 and the second light emitting unit EU2 to each other. In embodiments, the charge generation layer CGL may have a stack structure of a p dopant layer and an n dopant layer. For example, the p dopant layer may include a p-type dopant such as, for example, HAT-CN, TCNQ, and NDP-9, and the n dopant layer may include an alkali metal, an alkaline earth metal, a lanthanide metal, or a combination thereof. However, embodiments are not limited thereto.

In embodiments, the first light emitting layer EML1 and the second light emitting layer EML2 may generate light of different colors. Light emitted from each of the first light emitting layer EML1 and the second light emitting layer EML2 may be mixed and viewed as white light. For example, the first light emitting layer EML1 may generate blue light, and the second light emitting layer EML2 may generate yellow light. In embodiments, the second light emitting layer EML2 may include a structure in which a first sub light emitting layer configured to generate red light and a second sub light emitting layer configured to generate green light are stacked. The red light and the green light may be mixed, and thus the yellow light may be provided. In this case, an intermediate layer configured to perform a function of transporting holes and/or blocking transport of electrons may be further disposed between the first and second sub light emitting layers.

In other embodiments, the first light emitting layer EML1 and the second light emitting layer EML2 may generate light of the same color.

The light emitting structure may be formed through a method of vacuum deposition, inkjet printing, and the like, but embodiments are not limited thereto.

Figure 16:
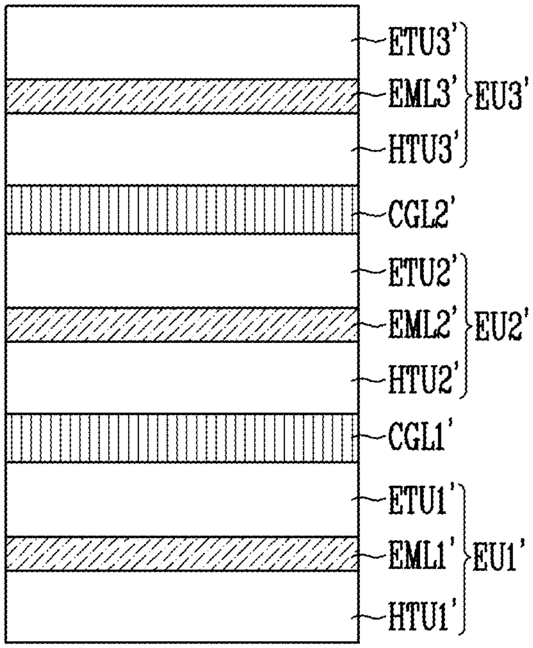
FIG. 16 is a cross-sectional view illustrating another embodiment of a portion of the light emitting structure included in one of the first to third light emitting elements of FIG. 12 or 13.

FIG. 16 is a cross-sectional view illustrating another embodiment of a portion of the light emitting structure included in one of the first to third light emitting elements of FIG. 12 or 13.

Referring to FIG. 16, the light emitting structure may have a tandem structure in which first to third light emitting units EU1' to EU3' are stacked. The light emitting structure may be configured substantially equally in each of the first to third light emitting elements LD1 to LD3 of FIG. 12.

Each of the first to third light emitting units EU1' to EU3' may include a light emitting layer that generates light according to an applied current. The first light emitting unit EU1' may include a first light emitting layer EML1', a first electron transport unit ETU1', and a first hole transport unit HTU1'. The first light emitting layer EML1' may be disposed between the first electron transport unit ETU1' and the first hole transport unit HTU1'. The second light emitting unit EU2' may include a second light emitting layer EML2', a second electron transport unit ETU2', and a second hole transport unit HTU2'. The second light emitting layer EML2' may be disposed between the second electron transport unit ETU2' and the second hole transport unit HTU2'. The third light emitting unit EU3' may include a third light emitting layer EML3', a third electron transport unit ETU3', and a third hole transport unit HTU3'. The third light emitting layer EML3' may be disposed between the third electron transport unit ETU3' and the third hole transport unit HTU3'.

Each of the first to third hole transport units HTU1' to HTU3' may include at least one of a hole injection layer and a hole transport layer, and may further include a hole buffer layer, an electron blocking layer, and the like based on implementation. The first to third hole transport units HTU1' to HTU3' may have configurations equal to each other or different from each other.

Each of the first to third electron transport units ETU1' to ETU3' may include at least one of an electron injection layer and an electron transport layer, and may further include an electron buffer layer, a hole blocking layer, and the like, based on implementation. The first to third electron transport units ETU1' to ETU3' may have configurations equal to each other or different from each other.

A first charge generation layer CGL1' is disposed between the first light emitting unit EU1' and the second light emitting unit EU2'. A second charge generation layer CGL2' is disposed between the second light emitting unit EU2' and the third light emitting unit EU3'.

In embodiments, the first to third light emitting layers EML1' to EML3' may generate light of different colors. Light emitted from each of the first to third light emitting layers EML1' to EML3' may be mixed and may be viewed as white light. For example, the first emitting layer EML1' may generate light of a blue color, the second emitting layer EML2' may generate light of a green color, and the third emitting layer EML3' may generate light of a red color.

In other embodiments, two or more of the first to third light emitting layers EML1' to EML3' may generate light of the same color.

Differently from that illustrated in FIGS. 15 and 16, the light emitting structure of FIG. 12 or 13 may include one light emitting unit in each of the first to third light emitting elements LD1 to LD3. At this time, the light emitting unit included in each of the first to third light emitting elements LD1 to LD3 may be configured to emit light of different colors. For example, the light emitting unit of the first light emitting element LD1 may emit the light of the red color, the light emitting unit of the second light emitting element LD2' may emit the light of the green light, and the light emitting unit of the third light emitting element LD3 may emit the light of the blue color. In this case, the light emitting units of the first to third sub-pixels SP1 to SP3 may be separated from each other, and each of them may be disposed in the opening (refer to OP of FIG. 12 and OP' of FIG. 13) of the pixel defining layer (refer to PDL of FIG. 12 or PDL' of FIG. 13). In this case, at least a portion of the color filters CF1 to CF3 may be omitted.

Figure 17:
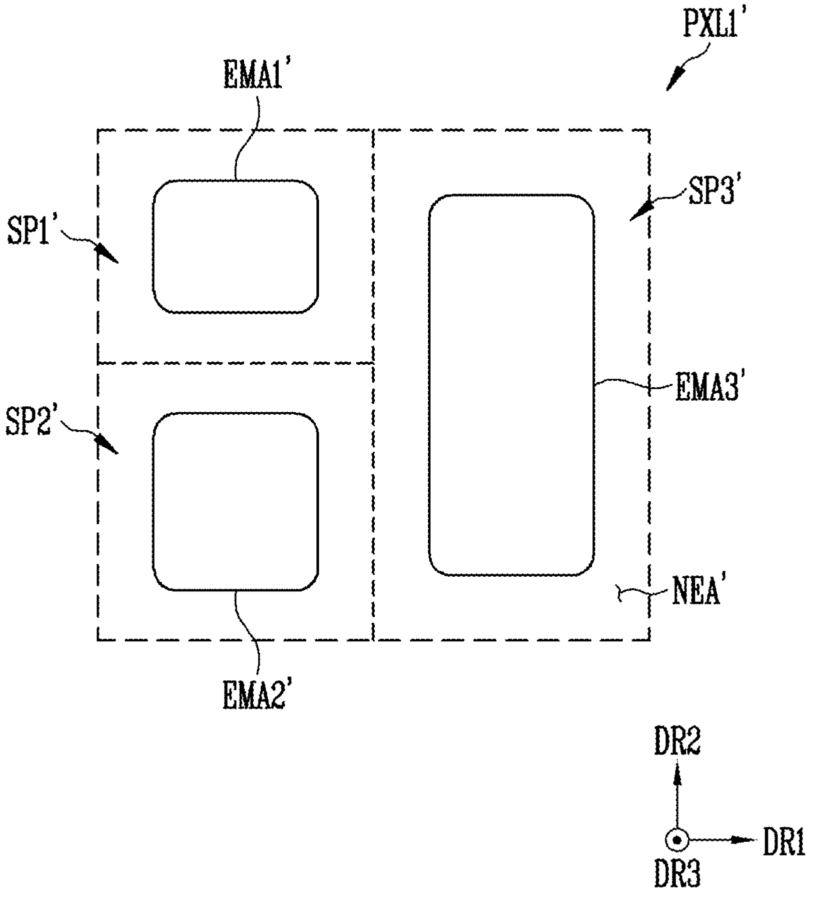
FIG. 17 is a plan view illustrating another embodiment of one of the pixels of FIG. 10.

FIG. 17 is a plan view illustrating another embodiment of one of the pixels of FIG. 10.

Referring to FIG. 17, a first pixel PXL1' may include first to third sub-pixels SP1' to SP3'.

The first sub-pixel SP1' may include a first emission area EMA1' and a non-emission area NEA' around the first emission area EMA1'. The second sub-pixel SP2' may include a second emission area EMA2' and a non-emission area NEA' around the second emission area EMA2'. The third sub-pixel SP3' may include a third emission area EMA3' and a non-emission area NEA' around the third emission area EMA3'.

The first sub-pixel SP1' and the second sub-pixel SP2' may be arranged in the second direction DR2. The third sub-pixel SP3' may be arranged in the first direction DR1 with respect to each of the first and second sub-pixels SP1' and SP2'.

The second sub-pixel SP2' may have an area greater than an area of the first sub-pixel SP1', and the third sub-pixel SP3' may have an area greater than an area of the second sub-pixel SP2'. Accordingly, the second emission area EMA2' may have an area greater than the area of the first emission area EMA1', and the third emission area EMA3' may have an area greater than the area of the second emission area EMA2'. However, embodiments are not limited thereto. For example, the first and second sub-pixels SP1' and SP2' may have substantially the same area, and the third sub-pixel SP3' may have an area greater than each of respective areas of the first and second sub-pixels SP1' and SP2'. As described herein, the areas of the first to third sub-pixels SP1' to SP3' may vary according to embodiments.

Figure 18:
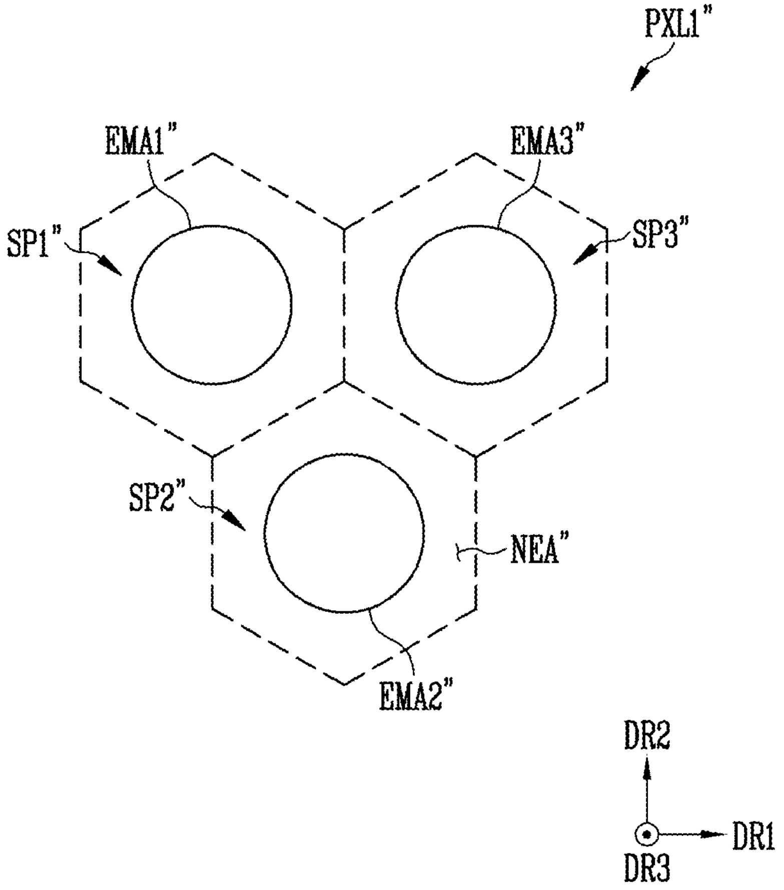
FIG. 18 is a plan view illustrating still another embodiment of one of the pixels of FIG. 10.

FIG. 18 is a plan view illustrating still another embodiment of one of the pixels of FIG. 10.

Referring to FIG. 18, a first sub-pixel SP1" may include a first emission area EMA1" and a non-emission area NEA" around the first emission area EMA1". A second sub-pixel SP2" may include a second emission area EMA2" and a non-emission area NEA" around the second emission area EMA2". A third sub-pixel SP3" may include a third emission area EMA3" and a non-emission area NEA" around the third emission area EMA3".

The first to third sub-pixels SP1" to SP3" may have polygonal shapes when viewed in the third direction DR3. For example, shapes of the first to third sub-pixels SP1" to SP3" may be hexagonal shapes as illustrated in FIG. 18.

The first to third emission areas EMA1" to EMA3" may have circular shapes when viewed in the third direction DR3. However, embodiments are not limited thereto. For example, each of the first to third emission areas EMA1" to EMA3" may have a polygonal shape.

The first and third sub-pixels SP1" and SP3" may be arranged in the first direction DR1. The second sub-pixel SP2" may be disposed in a direction inclined by an acute angle based on the second direction DR2 (or a diagonal direction) with respect to the first sub-pixel SP1".

An arrangement of the sub-pixels illustrated in FIGS. 11, 17, and 18 is an example, and embodiments are not limited thereto. Each pixel may include two or more sub-pixels, the sub-pixels may be arranged in various methods, the respective sub-pixels may have various shapes, and respective emission areas of the sub-pixels may also have various shapes.

Figure 19:
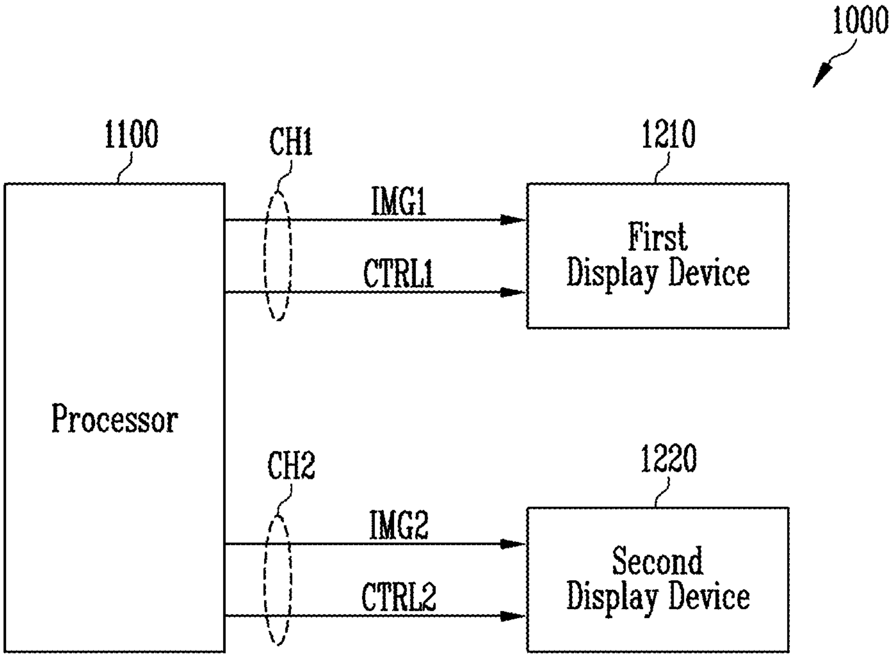
FIG. 19 is a block diagram illustrating an embodiment of a display system.

FIG. 19 is a block diagram illustrating an embodiment of a display system.

Referring to FIG. 19, the display system 1000 may include a processor 1100 and one or more display devices (e.g., first display device 1210 and second display device 1220).

The processor 1100 may perform various tasks and calculations. In embodiments, the processor 1100 may include an application processor, a graphic processor, a microprocessor, a central processing unit (CPU), and the like. The processor 1100 may be connected to other components of the display system 1000 through a bus system and may control the other components.

In FIG. 19, the display system 1000 includes the first display device 1210 and the second display device 1220. The processor 1100 may be connected to the first display device 1210 through a first channel CH1 and may be connected to the second display device 1220 through a second channel CH2.

Through the first channel CH1, the processor 1100 may transmit first image data IMG1 and a first control signal CTRL1 to the first display device 1210. The first display device 1210 may display an image based on the first image data IMG1 and the first control signal CTRL1. The first display device 1210 may be configured similarly to the display device 100 described with reference to FIG. 1. In this case, the first image data IMG1 and the first control signal CTRL1 may be provided as the input image data IMG and the control signal CTRL of FIG. 1, respectively.

Through the second channel CH2, the processor 1100 may transmit second image data IMG2 and a second control signal CTRL2 to the second display device 1220. The second display device 1220 may display an image based on the second image data IMG2 and the second control signal CTRL2. The second display device 1220 may be configured similarly to the display device 100 described with reference to FIG. 1. In this case, the second image data IMG2 and the second control signal CTRL2 may be provided as the input image data IMG and the control signal CTRL of FIG. 1, respectively.

The display system 1000 may include a computing system providing an image display function, such as, for example, a portable computer, a mobile phone, a smart phone, a tablet personal computer (PC), a smart watch, a watch phone, a portable multimedia player (PMP), a navigation device, and an ultra mobile personal computer (UMPC). In some aspects, the display system 1000 may include at least one of a head mounted display (HMD) device, a virtual reality (VR) device, a mixed reality (MR) device, and an augmented reality (AR) device.

Figure 20:
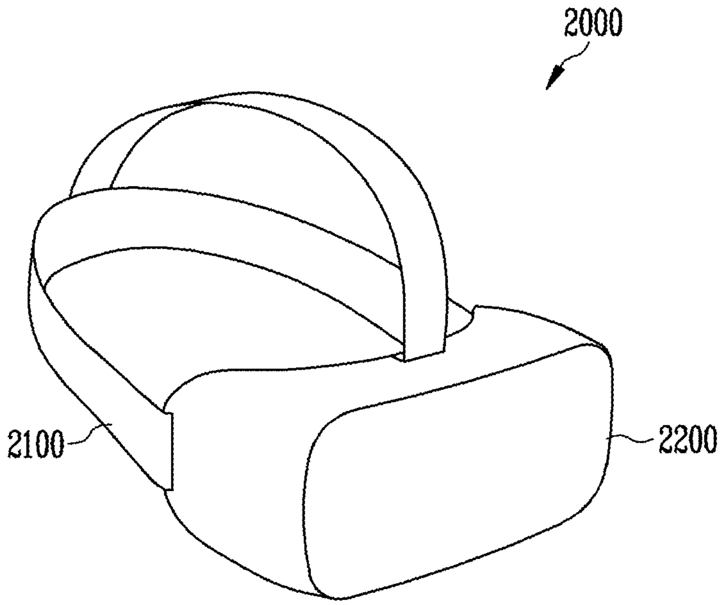
FIG. 20 is a perspective view illustrating an application example of the display system of FIG. 19.

FIG. 20 is a perspective view illustrating an application example of the display system of FIG. 19.

Referring to FIG. 20, the display system 1000 of FIG. 19 may be applied to a head mounted display device 2000. The head mounted display device 2000 may be a wearable electronic device that may be worn on a user's head.

The head mounted display device 2000 may include a head mount band 2100 and a display device receiving case 2200. The head mount band 2100 may be connected to the display device receiving case 2200. The head mount band 2100 may include a horizontal band and/or a vertical band for fixing the head mounted display device 2000 to the user's head. The horizontal band may be configured to surround a side portion of the user's head, and the vertical band may be configured to surround an upper portion of the user's head. However, embodiments are not limited thereto. For example, the head mount band 2100 may be implemented in a glasses frame form, a helmet form, or the like.

The display device receiving case 2200 may receive the first display device 1210 and the second display device 1220 of FIG. 19. The display device receiving case 2200 may further receive the processor 1100 of FIG. 19.

Figure 21:
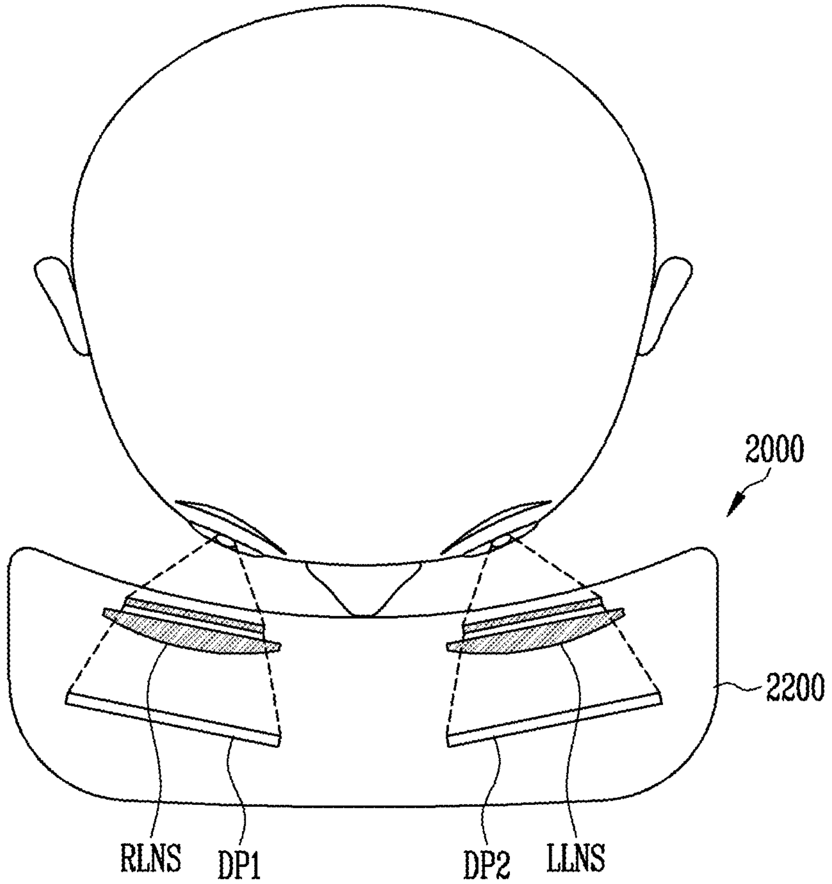
FIG. 21 is a drawing illustrating a head mounted display device worn by a user of FIG. 20.

FIG. 21 is a diagram illustrating the head mounted display device worn by a user of FIG. 20.

Referring to FIG. 21, in a head mounted display device 2000, a first display panel DP1 of the first display device 1210 and a second display panel DP2 of the second display device 1220 are disposed. The head mounted display device 2000 may further include one or more lenses LLNS and RLNS.

Within the display device receiving case 2200, the right eye lens RLNS may be disposed between the first display panel DP1 and a user's right eye. Within the display device receiving case 2200, the left eye lens LLNS may be disposed between the second display panel DP2 and a user's left eye.

An image output from the first display panel DP1 may be displayed to the user's right eye through the right eye lens RLNS. The right eye lens RLNS may refract light from the first display panel DP1 to be directed toward the user's right eye. The right eye lens RLNS may perform an optical function for adjusting a viewing distance between the first display panel DP1 and the user's right eye.

An image output from the second display panel DP2 may be displayed to the user's left eye through the left eye lens LLNS. The left eye lens LLNS may refract light from the second display panel DP2 to be directed toward the user's left eye. The left eye lens LLNS may perform an optical function for adjusting a viewing distance between the second display panel DP2 and the user's left eye.

In embodiments, each of the right eye lens RLNS and the left eye lens LLNS may include an optical lens having a pancake-shaped cross-section. In embodiments, each of the right eye lens RLNS and the left eye lens LLNS may include a multi-channel lens including sub-areas having different optical characteristics. In this case, each display panel may output images respectively corresponding to the sub-areas of the multi-channel lens, and the output images may pass through the respective corresponding sub-areas and may be viewed to the user.

Although specific embodiments and application examples have been described herein, other embodiments and modifications may be derived from the descriptions herein. Therefore, the spirit of the disclosure is not limited to the example embodiments, and extends to the claims set forth below, various obvious modifications, and equivalents.

What is claimed is:

1. A sub-pixel comprising:

a first transistor comprising a first electrode connected to a third node, a second electrode connected to a first node, and a gate electrode connected to a second node;

a second transistor comprising a first electrode connected to the second node, a second electrode electrically connected to one of a plurality of data lines, and a gate electrode electrically connected to a first sub-gate line;

a fourth transistor comprising a first electrode electrically connected to a third power line, a second electrode connected to the third node, and a gate electrode electrically connected to a second sub-gate line;

a third capacitor comprising an electrode connected to the gate electrode of the fourth transistor and another electrode connected to the second node; and a fourth capacitor comprising an electrode connected to the gate electrode of the second transistor and another electrode connected to the second node.

2. The sub-pixel according to claim 1, further comprising:

a third transistor comprising a first electrode connected to the first node, a second electrode electrically connected to a first power line to which a first driving voltage is applied, and a gate electrode electrically connected to an emission control line; and a light emitting element comprising an electrode connected to the third node and another electrode connected to a second power line to which a second driving voltage is applied.

3. The sub-pixel according to claim 2, further comprising:

a first capacitor comprising an electrode connected to the second node and another electrode connected to the first node; and a second capacitor comprising an electrode connected to the second node and another electrode connected to the third node.

4. The sub-pixel according to claim 3, wherein each of the first transistor to the fourth transistor is turned on during a first period.

5. The sub-pixel according to claim 4, wherein a data voltage is applied to the second node and an initialization voltage is applied to the third node during the first period.

6. The sub-pixel according to claim 4, wherein:

each of the first transistor, the second transistor, and the fourth transistor is turned on during a second period after the first period, and the third transistor is turned off during the second period.

7. The sub-pixel according to claim 6, wherein:

each of the first transistor, the third transistor, and the fourth transistor is turned on during a third period after the second period, and the second transistor is turned off during the third period.

8. The sub-pixel according to claim 7, wherein:

each of the first transistor and the third transistor is turned on during a fourth period after the third period, and each of the second transistor and the fourth transistor is turned off during the fourth period.

9. The sub-pixel according to claim 2, wherein:

each of the first transistor to the third transistor is a P-type transistor, and the fourth transistor is an N-type transistor.

10. The sub-pixel according to claim 2, wherein a capacitance of the third capacitor and a capacitance of the fourth capacitor are substantially equal.

11. A display device comprising:

a display panel comprising:

a plurality of sub-pixels;

a plurality of data lines;

a plurality of sub-gate lines; and an emission control line connected to the plurality of sub-pixels;

a data driver configured to provide data signals to the plurality of data lines;

a gate driver configured to provide gate signals to the plurality of sub-gate lines and an emission control signal to the emission control line; and a voltage generator configured to apply an initialization voltage, a first driving voltage, and a second driving voltage to the plurality of sub-pixels, wherein:

the plurality of sub-gate lines comprise a first sub-gate line and a second sub-gate line, and each of the plurality of sub-pixels comprises:

a first transistor comprising a first electrode connected to a third node, a second electrode connected to a first node, and a gate electrode connected to a second node;

a second transistor comprising a first electrode connected to the second node, a second electrode electrically connected to one of the plurality of data lines, and a gate electrode electrically connected to the first sub-gate line;

a fourth transistor comprising a first electrode electrically connected to a third power line, a second electrode connected to the third node, and a gate electrode electrically connected to the second sub-gate line;

a third capacitor comprising an electrode connected to the gate electrode of the fourth transistor and another electrode connected to the second node; and a fourth capacitor comprising an electrode connected to the gate electrode of the second transistor and another electrode connected to the second node.

12. The display device according to claim 11, wherein each of the plurality of sub-pixels further comprises:

a third transistor comprising a first electrode connected to the first node, a second electrode electrically connected to a first power line to which the first driving voltage is applied, and a gate electrode electrically connected to the emission control line;

a first capacitor comprising an electrode connected to the second node and another electrode connected to the first node;

a second capacitor comprising an electrode connected to the second node and another electrode connected to the third node; and a light emitting element comprising an electrode connected to the third node and another electrode connected to a second power line to which the second driving voltage is applied.

13. The display device according to claim 12, wherein:

the data driver provides a data signal to the second node during a first period, the gate driver provides a gate signal of a turn-on level to each of the second transistor and the fourth transistor during the first period, and the gate driver provides the emission control signal of a turn-on level to the third transistor during the first period.

14. The display device according to claim 13, wherein:

the data driver provides the data signal to the second node during a second period after the first period, the gate driver provides the gate signal of the turn-on level to each of the second transistor and the fourth transistor during the second period, and the gate driver provides the emission control signal of a turn-off level to the third transistor during the second period.

15. The display device according to claim 14, wherein:

the gate driver provides the gate signal of a turn-off level to the second transistor during a third period after the second period, the gate driver provides the emission control signal of a turn-on level to the third transistor during the third period, and the gate driver provides the gate signal of a turn-on level to the fourth transistor during the third period.

16. The display device according to claim 15, wherein:

the gate driver provides the gate signal of a turn-off level to the second transistor and the fourth transistor during a fourth period after the third period, and the gate driver provides the emission control signal of a turn-on level to the third transistor during the fourth period.

17. An electronic device, comprising:

a processor to provide input image data; and a display device to display an image based on the input image data, the display device comprising:

a display panel comprising:

a plurality of sub-pixels;

a plurality of data lines;

a plurality of sub-gate lines; and an emission control line connected to the plurality of sub-pixels;

a data driver configured to provide data signals to the plurality of data lines;

a gate driver configured to provide gate signals to the plurality of sub-gate lines and an emission control signal to the emission control line; and a voltage generator configured to apply an initialization voltage, a first driving voltage, and a second driving voltage to the plurality of sub-pixels, wherein:

the plurality of sub-gate lines comprise a first sub-gate line and a second sub-gate line, and each of the plurality of sub-pixels comprises:

a first transistor comprising a first electrode connected to a third node, a second electrode connected to a first node, and a gate electrode connected to a second node;

a second transistor comprising a first electrode connected to the second node, a second electrode electrically connected to one of the plurality of data lines, and a gate electrode electrically connected to the first sub-gate line;

a fourth transistor comprising a first electrode electrically connected to a third power line, a second electrode connected to the third node, and a gate electrode electrically connected to the second sub-gate line;

a third capacitor comprising an electrode connected to the gate electrode of the fourth transistor and another electrode connected to the second node; and a fourth capacitor comprising an electrode connected to the gate electrode of the second transistor and another electrode connected to the second node.

18. The electronic device according to claim 17, wherein each of the plurality of sub-pixels further comprises:

a third transistor comprising a first electrode connected to the first node, a second electrode electrically connected to a first power line to which the first driving voltage is applied, and a gate electrode electrically connected to the emission control line;

a first capacitor comprising an electrode connected to the second node and another electrode connected to the first node;

a second capacitor comprising an electrode connected to the second node and another electrode connected to the third node; and a light emitting element comprising an electrode connected to the third node and another electrode connected to a second power line to which the second driving voltage is applied.

* * * * *